(12) United States Patent
Guim Bernat et al.

(10) Patent No.: US 10,664,396 B2
(45) Date of Patent: May 26, 2020

(54) SYSTEMS, METHODS AND APPARATUS FOR FABRIC DELTA MERGE OPERATIONS TO ENHANCE NVMEOF STREAM WRITES

(71) Applicant: Intel Corporation, Santa Clara, CA (US)

(72) Inventors: Francesc Guim Bernat, Barcelona (ES); Kshitij Doshi, Tempe, AZ (US); Sujoy Sen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 195 days.

(21) Appl. No.: 15/724,311

(22) Filed: Oct. 4, 2017

(65) Prior Publication Data

US 2019/0102299 A1   Apr. 4, 2019

(51) Int. Cl.
| | |
|---|---|
| *G06F 12/0813* | (2016.01) |
| *G06F 3/06* | (2006.01) |
| *G06F 12/0868* | (2016.01) |
| *G06F 9/50* | (2006.01) |

(52) U.S. Cl.
CPC .......... *G06F 12/0813* (2013.01); *G06F 3/061* (2013.01); *G06F 3/0631* (2013.01); *G06F 3/0659* (2013.01); *G06F 3/0685* (2013.01); *G06F 3/0688* (2013.01); *G06F 9/5005* (2013.01); *G06F 12/0868* (2013.01); *G06F 2212/205* (2013.01)

(58) Field of Classification Search
CPC ............. G06F 12/0813; G06F 12/0868; G06F 9/5005; G06F 3/061; G06F 2212/205
See application file for complete search history.

(56) References Cited

U.S. PATENT DOCUMENTS

| | | | | |
|---|---|---|---|---|
| 5,394,531 A | * | 2/1995 | Smith | G06F 12/0866 711/129 |
| 6,700,889 B1 | * | 3/2004 | Nun | H04L 45/7453 370/392 |
| 6,963,954 B1 | * | 11/2005 | Trehus | G06F 12/0215 711/137 |
| 7,062,609 B1 | * | 6/2006 | Trehus | G06F 12/0835 709/236 |
| 7,958,510 B2 | * | 6/2011 | Mendelson | G06F 9/5011 710/200 |
| 9,626,274 B2 | * | 4/2017 | Yasin | G06F 11/3471 |

(Continued)

*Primary Examiner* — Ramon A. Mercado
(74) *Attorney, Agent, or Firm* — Viering, Jentschura & Partner MBB

(57) ABSTRACT

A method and apparatus for performing a data transfer, which include a selection a data transfer operation mode, based on telemetry data, from a first operation mode where a first type of data is transferred from a memory of a computing system to one or more shared storage devices, and a second operation mode where a second type of data is transferred from the memory to the one or more shared storage devices, the first type of data being associated with a first range of address space of the one or more shared storage devices, the second type of data being associated with a second range of address space of the one or more shared storage devices different from the first range of address space. Furthermore, a data transfer from the memory to the one or more shared storage devices in the selected data transfer operation mode may be included.

19 Claims, 12 Drawing Sheets

(56) References Cited

U.S. PATENT DOCUMENTS

| | | | |
|---|---|---|---|
| 2005/0160212 A1* | 7/2005 | Caruk | G06F 13/40 |
| | | | 710/301 |
| 2006/0010002 A1* | 1/2006 | Kunde | G07B 17/00362 |
| | | | 711/173 |
| 2006/0120200 A1* | 6/2006 | Pochmuller | G06F 12/06 |
| | | | 365/230.03 |
| 2008/0313357 A1* | 12/2008 | Wang | G06F 13/28 |
| | | | 710/14 |
| 2012/0206466 A1* | 8/2012 | Sharp | G06T 1/60 |
| | | | 345/543 |
| 2012/0271985 A1* | 10/2012 | Jeong | G06F 12/0238 |
| | | | 711/103 |
| 2013/0346695 A1* | 12/2013 | Loh | G06F 12/0895 |
| | | | 711/122 |
| 2014/0095805 A1* | 4/2014 | Kapil | G06F 9/546 |
| | | | 711/145 |
| 2015/0089317 A1* | 3/2015 | Patapoutian | H03M 13/353 |
| | | | 714/755 |
| 2015/0149259 A1* | 5/2015 | Song | G06F 16/2228 |
| | | | 705/7.37 |
| 2016/0117241 A1* | 4/2016 | Shah | G06F 12/0871 |
| | | | 711/119 |
| 2016/0188491 A1* | 6/2016 | Apodaca | G06F 12/126 |
| | | | 711/133 |
| 2017/0109279 A1* | 4/2017 | Vijayrao | G06F 12/084 |
| 2018/0024755 A1* | 1/2018 | Hassan | G06F 11/36 |
| | | | 711/112 |
| 2019/0102299 A1* | 4/2019 | Guim Bernat | G06F 12/0813 |

* cited by examiner

1000

Performing a data transfer of a first type of data from a memory of a computing system to one or more shared storage devices in a first operation mode, the first type of data being associated with a first range of address space of the one or more shared storage devices, the one or more shared storage devices being dissaggrate from the computing system

1030

Performing a data transfer of a second type of data from the memory to the one or more shared storage devices in a second operation mode, the second type of data being associated with a second range of address space of the one or more shared storage devices different from the first address range

1040

Switching between the first operation mode and the second operation mode based on telemetry data associated with at least one of the computing system or the one or more shared storage devices

Selecting a data transfer operation mode from a plurality of data transfer operation modes based on telemetry data, the plurality of data transfer operation modes including a first operation mode in which a first type of data is transferred from one or more requestor storage devices to one or more target storage devices, and a second data operation mode in which a second type of data is transferred from the one or more requestor storage devices to the one or more storage target devices, the first type of data being associated with a first address range of the one or more target storage devices, the second type of data being associated with a second address range of the one or more target storage devices different from the first address range

1160

Performing a data transfer from the one or more requestor storage devices to the one or more target storage devices in the selected data transfer operation mode

SYSTEMS, METHODS AND APPARATUS FOR FABRIC DELTA MERGE OPERATIONS TO ENHANCE NVMEOF STREAM WRITES

TECHNICAL FIELD

Various aspects described herein generally relate to systems, methods and devices for optimizing the management of networked storage resources, and more particularly relate to enhanced delta merge architectures and methods associated therewith.

BACKGROUND

The cost of implementing technological advances in a data center may be reduced by sharing network resources among a plurality of nodes. Certain operations, such as write transactions to shared network resources, may be optimized in terms of performance. However, as the number of nodes attempting to access shared network resources increases, latency may also increase despite such optimizations. As a result, the total available path bandwidth may become a bottleneck and counteract many of the speed advantages due to queuing delays over the storage access path.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 10 shows a first exemplary method for performing a data transfer over a networked storage architecture according to some aspects;

FIG. 11 shows a second exemplary method for performing a data transfer over a networked storage architecture according to some aspects.

DESCRIPTION

Figure 1:
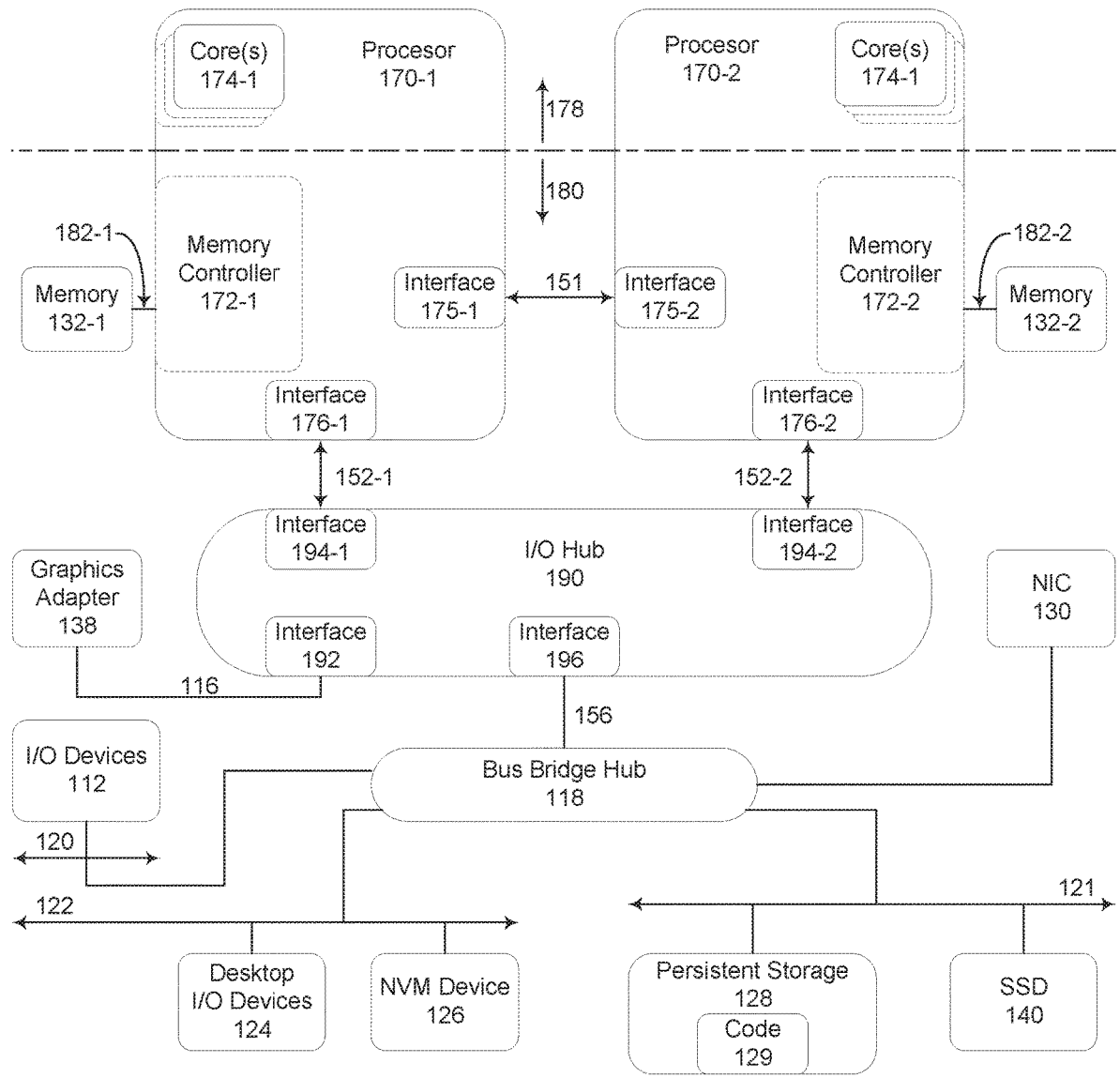
FIG. 1 shows a configuration of an exemplary computing system architecture.

The following detailed description refers to the accompanying drawings that show, by way of illustration, specific details and aspects in which the disclosure may be practiced.

Throughout the drawings, it should be noted that like reference numbers are used to depict the same or similar elements, features, and structures.

The word "exemplary" is used herein to mean "serving as an example, instance, or illustration." Any aspect or design described herein as "exemplary" is not necessarily to be construed as preferred or advantageous over some aspects or designs.

The words "plural" and "multiple" in the description and the claims expressly refer to a quantity greater than one. Accordingly, any phrases explicitly invoking the aforementioned words (e.g. "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more. The terms "proper subset," "reduced subset," and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g., a scalar), a 1×M vector (e.g., a row vector), and an M×1 vector (e.g., a column vector). Similarly, it is appreciated that references to a "matrix" may refer to matrix of any size or orientation, e.g. including a 1×1 matrix (e.g., a scalar), a 1×M matrix (e.g., a row vector), and an M×1 matrix (e.g., a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit." It is understood that any two (or more) of the circuits detailed herein may be realized as a single circuit with equivalent functionality or the like, and conversely that any single circuit detailed herein may be realized as two (or more) separate circuits with equivalent functionality or the like. Additionally, references to a "circuit" may refer to two or more circuits that collectively form a single circuit.

As used herein, "memory," "memory device," and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, etc., or any combination thereof. Furthermore, it is appreciated that registers, shift registers, processor registers, data buffers, etc., are also embraced herein by the term memory.

It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

A volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In some aspects, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Various aspects may be applied to any memory device that comprises non-volatile memory. In one aspect, the memory device is a block addressable memory device, such as those based on negative-AND (NAND) logic or negative-OR (NOR) logic technologies. A memory may also include future generation nonvolatile devices, such as a XPoint memory device, or other byte addressable write-in-place nonvolatile memory devices. A XPoint memory may comprise a transistor-less stackable crosspoint architecture in which memory cells sit at the intersection of word lines and bit lines and are individually addressable and in which bit storage is based on a change in bulk resistance.

In some aspects, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thiristor based memory device, or a combination of any of the above, or other memory. The terms memory or memory device may refer to the die itself and/or to a packaged memory product.

FIG. 1 shows a configuration of an exemplary computing system 100 architecture. As shown in FIG. 1, the system 100 may include a first processor 170-1, a second processor 170-2, a first memory interconnection 182-1, a second memory interconnection 182-2, a first memory 132-1, a second memory 132-2, a processor-processor interconnection 151, a first processor-hub interconnection 152-1, a second processor-hub interconnection 152-2, an Input/Output (I/O) hub 190, a graphics interconnection 116, a graphics adapter 138, a hub-hub interconnection 156, a bus bridge hub 118, a general purpose serial communication bus 120, I/O devices 112, a low bandwidth bus 122, desktop I/O devices 124, an NVM device 126, a storage protocol bus 121, a persistent storage device 128, a solid state drive (SSD) 140, and/or a network interface controller (NIC) 130. Although the first processor 170-1, the second processor 170-2, the first memory interconnection 182-1, the second memory interconnection 182-2, the first memory 132-1, the second memory 132-2, the processor-processor interconnection 151, the first processor-hub interconnection 152-1, the second processor-hub interconnection 152-2, the I/O hub 190, the graphics interconnection 116, the graphics adapter 138, the hub-hub interconnection 156, the bus bridge hub 118, the general purpose serial communication bus 120, the I/O devices 112, the low bandwidth bus 122, the desktop I/O devices 124, the NVM device 126, the storage protocol bus 121, the persistent storage device 128, the SSD 140, and/or the NIC 130 are illustrated within the computing system 100 of FIG. 1, some aspects may employ additional or fewer processors, memory interconnections, memories, processor-processor interconnections, processor-hub interconnections, I/O hubs, graphics interconnections, graphics adapters, hub-hub interconnections, bus bridge hubs, general purpose serial communication buses, I/O devices, low bandwidth buses, desktop I/O devices, NVM devices, storage protocol buses, persistent storage devices, SSDs, NICs, and/or other elements.

In some aspects, computing system 100 may be a multi-processor system that includes the first processor 170-1 and the second processor 170-2. According to some aspects, the first processor 170-1 and the second processor 170-2 may be generally referred to herein as "one or more processors 170," "processors 170" and more generally "processor 170." Although two processors 170-1 and 170-2 are shown in FIG. 1, this number is merely selected for illustrative purposes. As previously indicated, additional or fewer processors may be implemented depending upon system resources and requirements. Each processor 170 of the one or more processors 170 may include various components and/or aspects. While some of these components and/or aspects are described with reference to the first processor 170-1, one or more of the remaining processors 170 may include the same or similar components and/or aspects discussed with reference to the first processor 170-1.

Each processor 170 of the one or more processors 170 may include a core region 178 and an integration region 180. In some aspects, core region 178 of the first processor 170-1 may include one or more processing cores 174, whereas integration region 180 of the first processor 170-1 may include a first memory controller 172-1, a first processor-hub interface 176-1, and/or a first processor-processor interface 175-1. Although the core region 178, the integration region 180, the one or more processing cores 174 the first memory controller 172-1, the first processor-hub interface 176-1, and the first processor-processor interface 175-1 are illustrated within the first processor 170-1 of FIG. 1, some aspects may employ additional or fewer regions, processing cores, memory controllers, processor-hub interfaces, processor-processor interfaces, and/or other elements. For instance, the first memory controller 172-1 may be external to the first processor 170-1 according to at least one aspect. The first memory controller 172-1 may, in some aspects, be used in conjunction with an external memory controller.

With continued reference to FIG. 1, the one or more processor cores 174 may be generally referred to herein as "cores 174" and more generally "core 174." Each core 174 of the one or more processor cores 174 may include various components and/or aspects. While some of these components and/or aspects are described with reference to processor core 174-1, one or more of the remaining processor cores 174 may include the same or similar components and/or aspects discussed with reference to the processor core 174-1.

In some aspects, the one or more processing cores 174 may each include hardware and firmware resources to support an execution pipeline. These resources may include, in some aspects, at least a portion of a cache memory hierarchy, and/or have access to a cache memory hierarchy. According to at least one aspect, the cache memory hierarchy may be shared or private, and may further include a dedicated level one (L1) instruction cache, a dedicated L1 data cache, a level two (L2) data/instruction cache, or a combination thereof. According to some aspects, these resources may further include prefetch logic and buffers, branch prediction logic, decode logic, a register file, various parallel execution resources including arithmetic logic units, floating point units, load/store units, address generation units, a data cache, I/O control logic, look-up tables, and/or indices, etc. Although specific implementations of the one or more processing cores 174 have been described, the present disclosure is not necessarily limited to these aspects.

With continued reference to FIG. 1, the first memory controller 172-1 and a second memory controller 172-2 may be generally referred to herein as "one or more memory controllers 172," "memory controllers 172" and more generally "memory controller 172." Although two memory controllers 172 are shown in FIG. 1, this number is merely selected for illustrative purposes. As previously indicated, additional or fewer memory controllers may be implemented depending upon system resources and requirements. Each memory controller 172 of the one or more memory controllers 172 may include various components and/or aspects. While some of these components and/or aspects are described with reference to memory controller 172-1, one or more of the remaining memory controllers 172 may include the same or similar components and/or aspects discussed with reference to the first memory controller 172-1.

With continued reference to FIG. 1, the first memory interconnection 182-1 and the second memory interconnection 182-2 may be generally referred to herein as "one or more memory interconnections 182," "memory interconnections 182" and more generally "memory interconnection 182." Although two memory interconnections 182 are shown in FIG. 1, this number is merely selected for illustrative purposes. As previously indicated, additional or fewer memory interconnections may be implemented depending upon system resources and requirements. Each memory interconnection 182 of the one or more memory interconnections 182 may include various components and/or or aspects. While some of these components and/or aspects are described with reference to the first memory interconnection 182-1, one or more of the remaining memory interconnections 182 may include the same or similar components and/or aspects discussed with reference to the first memory interconnection 182-1.

With continued reference to FIG. 1, the first memory 132-1 and the second memory 132-2 may be generally referred to herein as "one or more memories 132," "memories 132" and more generally "memory 132." Although two memories 132 are shown in FIG. 1, this number is merely selected for illustrative purposes. As previously indicated, additional or fewer memories may be implemented depending upon system resources and requirements. Each memory 132 of the one or more memories 132 may include various components and/or aspects. For instance, each memory 132 of the one or more memories 132 may include a set of memory. While some of these components and/or aspects are described with reference to the first memory 132-1, one or more of the remaining memories 132 may include the same or similar components and/or aspects discussed with reference to the first memory 132-1.

In some aspects, each memory controller 172 of the one or more memory controllers 172 may be configured to support a bidirectional transfer of data between one or more processors 170 and the memory 132 via a memory interconnection 182. For instance, the first memory controller 172-1 may be configured to support a bidirectional transfer of data between one or more processors 170 and the first memory 132-1 via the first memory interconnection 182-1. According to at least one aspect, each memory controller 172 of the one or more memory controllers 172 may be configured to support a bidirectional transfer of data between one or more processors 170 and the cache memory hierarchy.

In some aspects, each memory controller 172 of the one or more memory controllers 172 may be configured to receive an I/O request to access a block of the memory 132 and/or the cache memory hierarchy. According to at least one aspect, each memory controller 172 of the one or more memory controllers 172 may be configured to issue one or more requests (e.g., read requests, write requests) to the memory 132 and/or the cache memory hierarchy based on a received I/O request. In at least one aspect, one or more of these processes may include cooperation with one or more components (e.g, drivers) identified in the received I/O request.

With continued reference to FIG. 1, the first memory 132-1 may, for instance, be considered to be local to the first processor 170-1 and represent a portion of the memory 132 as a whole. According to at least one aspect, the second memory 132-2 may be considered to be local to the second processor 170-2 and also represent a portion of the memory 132 as a whole. In some aspects, system 100 may be a distributed memory multiprocessor system in which each processor 170 of the one or more processors 170 can access each portion of the memory 132 and/or the cache memory hierarchy, whether local or not. According to at least one aspect, while local access may have lower latency, access to non-local portions of memory 132 and/or the cache memory hierarchy are permitted.

In some aspects, the memory 132 may be a DDR-type DRAM, whereas one or more memory interconnections 182 and one or more memory controllers 172 may comply with one or more DDR interface specification. In at least one aspect, memory 132 may include two levels of memory (2LM), or 3D XPoint memory, or DRAM & 3D XPoint memory, etc. Memory 132, in some aspects, may represent a bank of memory interfaces (or slots) that may be populated with corresponding memory circuits for a DRAM capacity and/or 3D XPoint memory capacity. According to some aspects, the bank of memory interfaces may comply with a DDR interface specification, such as DDR and/or DDR-Transactional (DDR-T).

With continued reference to FIG. 1, the first processor-hub interface 176-1 and the second processor-hub interface 176-2 may be generally referred to herein as "one or more processor-hub interfaces 176," "processor-hub interfaces 176" and more generally "processor-hub interfaces 176."

Although two processor-hub interfaces 176 are shown in FIG. 1, this number is merely selected for illustrative purposes. As previously indicated, additional or fewer processor-hub interfaces may be implemented depending upon system resources and requirements. Each processor-hub interface 176 of the one or more processor-hub interfaces 176 may include various components and/or aspects. While some of these components and/or aspects are described with reference to the first processor-hub interface 176-1, one or more of the remaining processor-hub interfaces 176 may include the same or similar components and/or aspects discussed with reference to the first processor-hub interface 176-1.

With continued reference to FIG. 1, the first processor-processor interface 175-1 and the second processor-processor interface 175-2 may be generally referred to herein as "one or more processor-processor interfaces 175," "processor-processor interfaces 175" and more generally "processor-processor interfaces 175." Although two processor-processor interfaces 175 are shown in FIG. 1, this number is merely selected for illustrative purposes. As previously indicated, additional or fewer processor-processor interfaces may be implemented depending upon system resources and requirements. Each processor-processor interface 175 of the one or more processor-processor interfaces 175 may include various components and/or aspects. While some of these components and/or aspects are described with reference to the first processor-processor interface 175-1, one or more of the remaining processor-processor interfaces 175 may include the same or similar components and/or aspects discussed with reference to the first processor-processor interface 175-1.

With continued reference to FIG. 1, the first processor-hub interconnection 152-1 and the second processor-hub interconnection 152-2 may be generally referred to herein as "one or more processor-hub interconnections 152," "processor-hub interconnections 152" and more generally "processor-hub interconnections 152." Although two processor-hub interconnections 152 are shown in FIG. 1, this number is merely selected for illustrative purposes. As previously indicated, additional or fewer processor-hub interconnections may be implemented depending upon system resources and requirements. Each processor-hub interconnection 152 of the one or more processor-hub interconnections 152 may include various components and/or aspects. While some of these components and/or aspects are described with reference to the first processor-hub interconnection 152-1, one or more of the remaining processor-hub interconnections 152 may include the same or similar components and/or aspects discussed with reference to the first processor-hub interconnection 152-1.

As shown in FIG. 1, the I/O hub 190 may, in some aspects, include a first hub-processor interface 194-1, a second hub-processor interface 194-2, a graphics interface 192, and/or a hub-hub interface 196. Although the first hub-processor interface 194-1, the second hub-processor interface 194-2, the graphics interface 192, and/or the hub-hub interface 196 are illustrated within the I/O hub 192 of FIG. 1, some aspects may employ additional or fewer hub-processor interfaces, graphics interfaces, hub-hub interfaces, and/or other elements. For instance, the I/O hub 190 may, in some aspects, include a processor (e.g., microprocessor) and one or more memories. For improved latency characteristics, I/O hub 190 may be merged onto one or more processors 170 in accordance with at least one alternative aspect.

With continued reference to FIG. 1, the first hub-processor interface 194-1 and the second hub-processor interface 194-2 may be generally referred to herein as "one or more hub-processor interfaces 194," "hub-processor interfaces 194" and more generally "hub-processor interfaces 194." Although two hub-processor interfaces 194 are shown in FIG. 1, this number is merely selected for illustrative purposes. As previously indicated, additional or fewer hub-processor interfaces may be implemented depending upon system resources and requirements. Each hub-processor interface 194 of the one or more hub-processor interfaces 194 may include various components and/or aspects. While some of these components and/or aspects are described with reference to the first hub-processor interface 194-1, one or more of the remaining hub-processor interfaces 194 may include the same or similar components and/or aspects discussed with reference to the first hub-processor interface 194-1.

As shown in FIG. 1, the each processor 170 of the one or more processors 170 may include various interfaces. In some aspects, the first processor 170 may in some aspects, include the first processor-processor interface 175-1, which is configured to support a bidirectional transfer of data with the second processor-processor interface 175-2 of the second processor 170-2 via the processor-processor interconnection 151. As previously indicated, additional or fewer processor-processor interconnections 151 may be implemented depending upon system resources and requirements. According to at least one aspect, the first processor 170-1 may include the first processor-hub interface 176-1, which is configured to support the bidirectional transfer of data with the first hub-processor interface 194-1 of the I/O hub 190 via the first processor-hub interconnection 152-1. Processor-processor interconnections 151 and processor-hub interconnections 152 may, in some aspects, be distinct instances of a common set of interconnections. In at least one aspect, processor-hub interconnections 152 may differ from processor-processor interconnections 151.

In some aspects, the I/O hub 190 may be configured to perform various communications. According to at least on aspect, the I/O hub 190 may be configured to communicated with the first processor 170-1 via the first processor-hub interface 176-1, the interconnection 152-1, and the hub-processor interface 194-1. The I/O hub 190 may, in some aspects, be configured to communicate with the graphics adapter 138 via the graphics interface 192 and the graphics interconnection 116. In at least one aspect, the I/O hub 190 may be configured to communicate with one or more target nodes via the bus bridge hub 118 and the NIC 130. According to some aspects, the I/O hub 190 may be configured to perform various types of data transfers with one or more storage devices of the one or more target nodes over a network.

In some aspects, the graphics interconnection 116 may be implemented as a high speed serial bus. For instance, the graphics interconnection 116 may be implemented as a peripheral component interconnect express (PCIe) bus or another type of bus. According to at least one aspect, the I/O hub 190 may, in some aspects, be configured to communicate with the bus bridge hub 118 through the hub-hub interface 196 and the hub-hub interconnection 156.

With continued reference to FIG. 1, the bus bridge hub 118 may be configured to support various bus protocols for different types of I/O devices and/or peripheral devices. In some aspects, the bus bridge hub 118 may be configured to communicate over the general purpose serial communication bus 120 to support various I/O devices 112. According to at least one aspect, the general purpose serial communication bus 120 may be implemented as a universal serial bus (USB), PCI, NVM Express (NVMe), NVMe over fabric (NVMeoF), etc.

In some aspects, the bus bridge hub 118 may be configured to communicate over the low bandwidth bus 122 to support legacy interfaces, referred to herein as the desktop I/O devices 124. According to at least one aspect, the low bandwidth bus 122 may be implemented as a low pin count (LPC) bus, an inter-integrated circuit (I2C) bus, or an Industry Standard Architecture (ISA) bus, etc. Desktop I/O devices 124 may, in some aspects, include interfaces for a keyboard, a mouse, a serial port, a parallel port, and/or a removable media drive. In at least one aspects, the low bandwidth bus 122 may include an interface for the NVM device 126 (e.g., flash ROM).

With continued reference to FIG. 1, the bus bridge hub 118 may, in some aspects, be configured to communicate over the storage protocol bus 121 to support the persistent storage device 128 and/or SSD 140. According to at least one aspect, the storage protocol bus 121 may be implemented as a serial AT attachment (SATA) bus, or a small computer system interface (SCSI) bus, etc. The persistent storage device 128 may, in some aspects, be implemented as a magnetic core hard disk drives (HDD).

In at least one aspect, the persistent storage device 128 may, in some aspects, include store code 129. Although the store code 129 is illustrated in the persistent storage device 128 of FIG. 1, some aspects may employ additional and/or different types of code, and/or other elements. According to at least one aspect, the store code 129 may include processor-executable instructions. Processor-executable instructions may, in some aspects, include operating system instructions, application program instructions, and so forth, that, when executed by one or more of the processors 170, cause the respective processor(s) to perform operations described herein.

With continued reference to FIG. 1, the bus bridge hub 118 may, in some aspects be configured to communicate with the NIC 130. According to at least one aspect, NIC 130 may be configured to implement one or more protocols, such as a packet-switched network communication protocol. The packet-switched network communication protocol may, in some aspects, be a Gigabit Ethernet network communication protocol. In at least one aspect, the Gigabit Ethernet network communication protocol may be defined by the IEEE 802.3-2008 standard.

Although specific instances of communication busses and bus targets have been illustrated and described, some aspects may employ different communication busses and different target devices.

Figure 2:
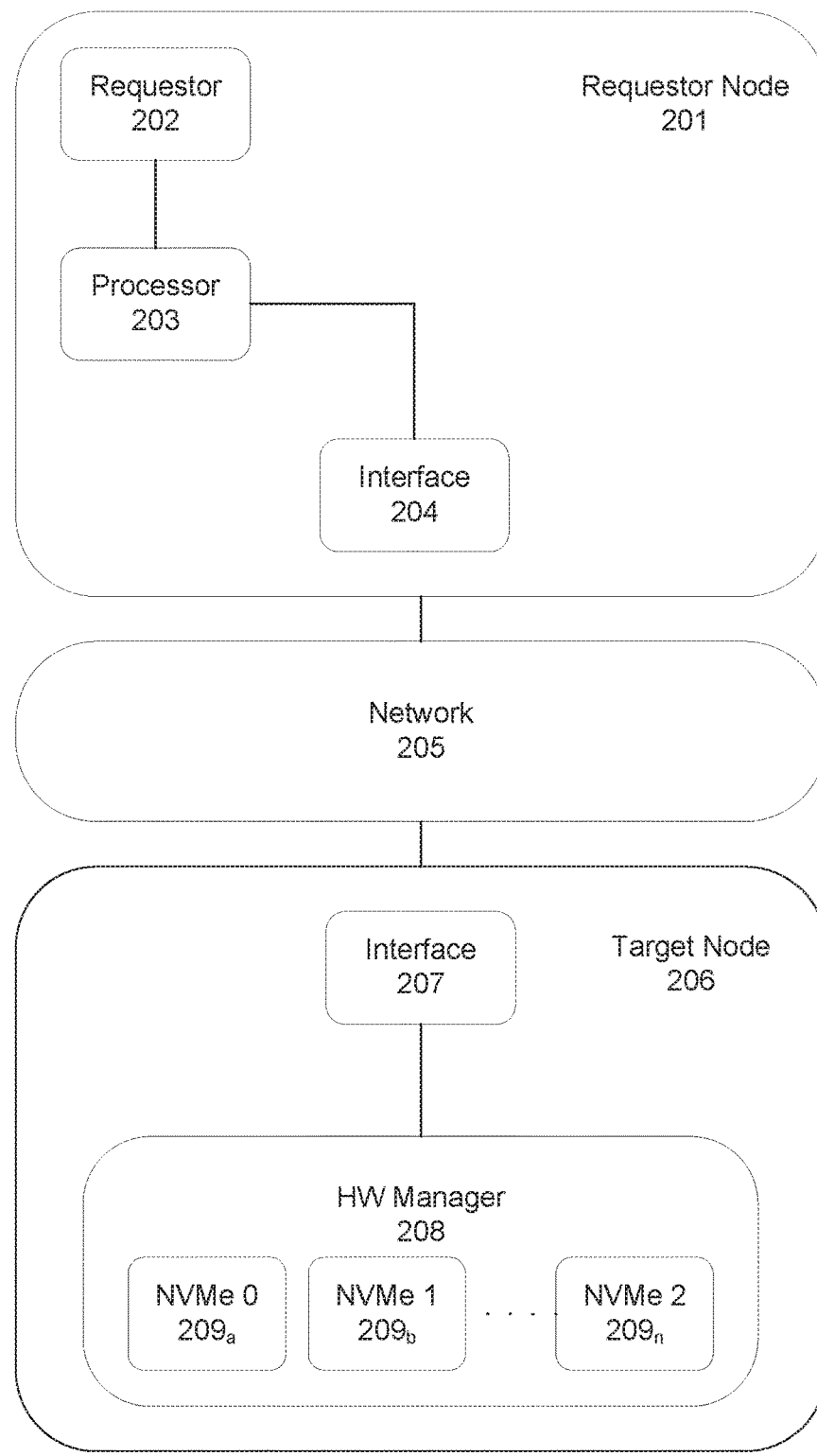
FIG. 2 shows a first exemplary networked storage architecture.

FIG. 2 shows a first exemplary networked storage architecture 200 according to some aspects. As shown in FIG. 2, the networked storage architecture 200 may include a requestor node 201, network 205, and target node 206. In some aspects, requestor node 201 may correspond to computing system 100 of FIG. 1. Target node 206 may, in accordance with at least one aspect, correspond to computing system 100 of FIG. 1. Although requestor 201, network 205, and target node 206 are illustrated in FIG. 2, some aspects may employ additional and/or different requestor nodes, networks, target nodes, and/or other elements.

With continued reference to FIG. 2, requestor node 201 may include a requestor 202, a processor 203 and an interface 204. In some aspects, processor 203 may correspond to one or more of processors 170 of FIG. 1. According to at least one aspect, interface 204 may correspond to NIC 130 of FIG. 1. Interface 204 may, in some aspects, be implemented as a host fabric interface (HFI). Although requestor 202, processor 203 and interface 204 are illustrated in FIG. 2, some aspects may employ additional and/or different requestors 202, processors 203, interface 204, and/or other elements.

With continued reference to FIG. 2, processor 203 may include various drivers. In some aspects, processor 203 may include a userspace driver configured to minimize CPU overhead of operations, such as driver operations. Userspace driver may be implemented as an NVMe driver according to at least one aspect. Processor 203 may, in accord with some aspects, include a memory driver configured to process read and/or write requests to one or more storage devices (e.g., persistent storage 128, SSD 140, etc.) supported by one or more devices $209_a$-$209_n$. Memory driver may, for instance, be configured to process read and/or write requests to one or more storage devices (e.g., persistent storage 128, SSD 140, etc.) supported by one or more devices $208_a$-$208_n$ after the processing of a storage application. According to at least one aspect, processor 203 may include a direct memory access (DMA) engine configured to process read and/or write requests to one or more storage devices (e.g., persistent storage 128, SSD 140, etc.) supported by one or more devices $209_a$-$209_n$ in some aspects. DMA engine, for example, may be configured to process read and/or write requests to one or more storage devices (e.g., persistent storage 128, SSD 140, etc.) supported by one or more devices $209_a$-$209_n$ after the processing of a storage application. DMA engine may be implemented as a DMA acceleration engine.

Although specific implementations of processor 203 and interface 204 have been described, the present disclosure is not necessarily limited to these aspects.

With continued reference to FIG. 2, network 205 may take various forms. In some aspects, network 205 may include one or more nodes interconnected over communication media. For instance, network 205 may include a topology in which nodes pass data to each other. In at least one aspect, network 205 may include a fabric of interconnecting switches containing, for instance, one or more pine switches. Despite being illustrated as separately, network 205 may include requestor node 201 and target node 206.

The fabric of interconnecting switches may constitute a portion of an NVMeoF architecture. According to at least one aspect, an NVMeoF architecture is designed to work with a variety of storage fabric technologies, including an NVMeoF using remote direct memory access (RDMA), NVMeoF using Fibre Channel (FC-NVMe), next generation fabrics, etc. In some aspects, RDMA with NVMeoF may include any of the RDMA technologies, such as InfiniBand (IB), RDMA over Converged Ethernet (RoCE), Intel® Omni-Path Architecture, iWARP, etc. Although specific implementations of network 205 have been described, the present disclosure is not necessarily limited to these aspects.

With continued reference to FIG. 2, target node 206 may include interface 207 and hardware (HW) manager 208. In some aspects, interface 207 may correspond to NIC 130 of FIG. 1. According to at least one aspect, interface 207 may be implemented as an HFI. Interface 207 may, in some aspects, be a multiple spanning tree (MST). In at least one aspect, HW manager 208 may be a HW and/or software (SW) manager. Although interface 207 and HW manager 208 are illustrated in FIG. 2, some aspects may employ additional and/or different NICs 207, HW managers 208, and/or other elements.

With continued reference to FIG. 2, HW manager 208 may be configured to host requestor node 201. In at least one aspect, HW manager 208 may be configured to host an operating system of a requestor node 201. HW manager 208 may implement a hypervisor, such as a Quick Emulator (QEMU). HW manager 208 may, in some aspects, be configured to provide requestor node 201 with access to one or more devices $209_a$-$209_n$ provided by and/or communicatively coupled to target node 206. For instance, HW manager 208 may be configured to expose requestor node 201 to one or more devices $209_a$-$209_n$ as an address space. In some aspects, HW manager 208 may be configured to expose requestor node 201 to one or more devices $209_a$-$209_n$ as an address space as if the one or more devices $209_a$-$209_n$ were local to requestor node 201. According to at least one aspect, HW manager 208 may be configured to provide requestor node 201 the ability to read and modify a particular range of address space of one or more devices $209_a$-$209_n$. Although specific implementations of one or more devices $209_a$-$209_n$ have been described, the present disclosure is not necessarily limited to these aspects.

With continued reference to FIG. 2, one or more devices $209_a$-$209_n$ may be organized in various manners. In some aspects, one or more devices $209_a$-$209_n$ may be organized, either individually and/or collectively, in an address space. According to at least one aspect, the address space of the one or more devices $209_a$-$209_n$ may be grouped in one or more ranges. Each range of address space may, in some aspects, define a particular range of address space of the one or more devices $209_a$-$209_n$.

With continued reference to FIG. 2, each range of address space of the one or more devices $209_a$-$209_n$ may be defined with various configurations. In some aspects, two or more ranges of address space may be non-overlapping. For example, one or more ranges of address space may be mutually exclusive from all other ranges of address space of the one or more devices $209_a$-$209_n$. According to at least one aspect, two or more ranges of address space may, in some aspects, be overlapping. A range of address space of the one or more devices $209_a$-$209_n$ may, for instance, be mutually inclusive—in whole or in part—with another range of address space of the one or more devices $209_a$-$209_n$. For example, a portion of a range of address space may encompass an entire range of address space of another. Additionally or alternatively, each range of address space of the one or more devices $209_a$-$209_n$ may have a size associated therewith. According to some aspects, each range of address space may have a static size. Each range of address space may, in at least one aspect, have a dynamic size.

With continued reference to FIG. 2, each range of address space of the one or more devices $209_a$-$209_n$ may be defined with various configurations by one or more entities. In some aspects, the one or more entities may include requestor node 201, target node 206, and/or another node on network 205. According to at least one aspect, the one or more entities may comprise logic (e.g., a software stack) configured to define a range of address space of the one or more devices $209_a$-$209_n$. The logic may, for instance, be stored on the one or more entities, individually, collectively, and/or some combination thereof.

With continued reference to FIG. 2, the one or more entities may be configured to define a range of address space of the one or more devices $209_a$-$209_n$ based on various conditions. In some aspects, one or more entities may be configured to define the range of address space of the one or more devices $209_a$-$209_n$ based on traffic over the network 205. For instance, the one or more entities may be configured to define the size of the range of address space of the one or more devices $209_a$-$209_n$ based on the number threads being generated. The one or more entities may be configured to define whether the range of an address space of the one or more devices $209_a$-$209_n$ will overlap with the range of another address space of the one or more devices $209_a$-$209_n$, based on the number threads being generated.

With continued reference to FIG. 2, one or more devices $209_a$-$209_n$ may be associated with other devices in various manners. In some aspects, one or more devices $209_a$-$209_n$ (e.g., device $209_a$) may be associated with requestor node 201. One or more of the devices $209_a$-$209_n$ may be configured to support one or more storage devices (e.g., persistent storage 128, SSD 140, etc.). One or more storage devices may be communicably coupled to target node 206. According to at least one aspect, HW manager 208 may be configured to provide requestor node 201 the ability to read and modify a particular range of address space of devices $209_a$.

With continued reference to FIG. 2, each of the one or more devices $209_a$-$209_n$ may be implemented as an NVMe device. According to at least one aspect, the one or more devices $209_a$-$209_n$, for instance, may be represented as NVMe 0-NVMe 2 in a directory, respectively.

Although specific implementations of interface 207, HW manager 208 and one or more devices $208_a$-$208_n$ have been described, the present disclosure is not necessarily limited to these aspects.

Figure 3:
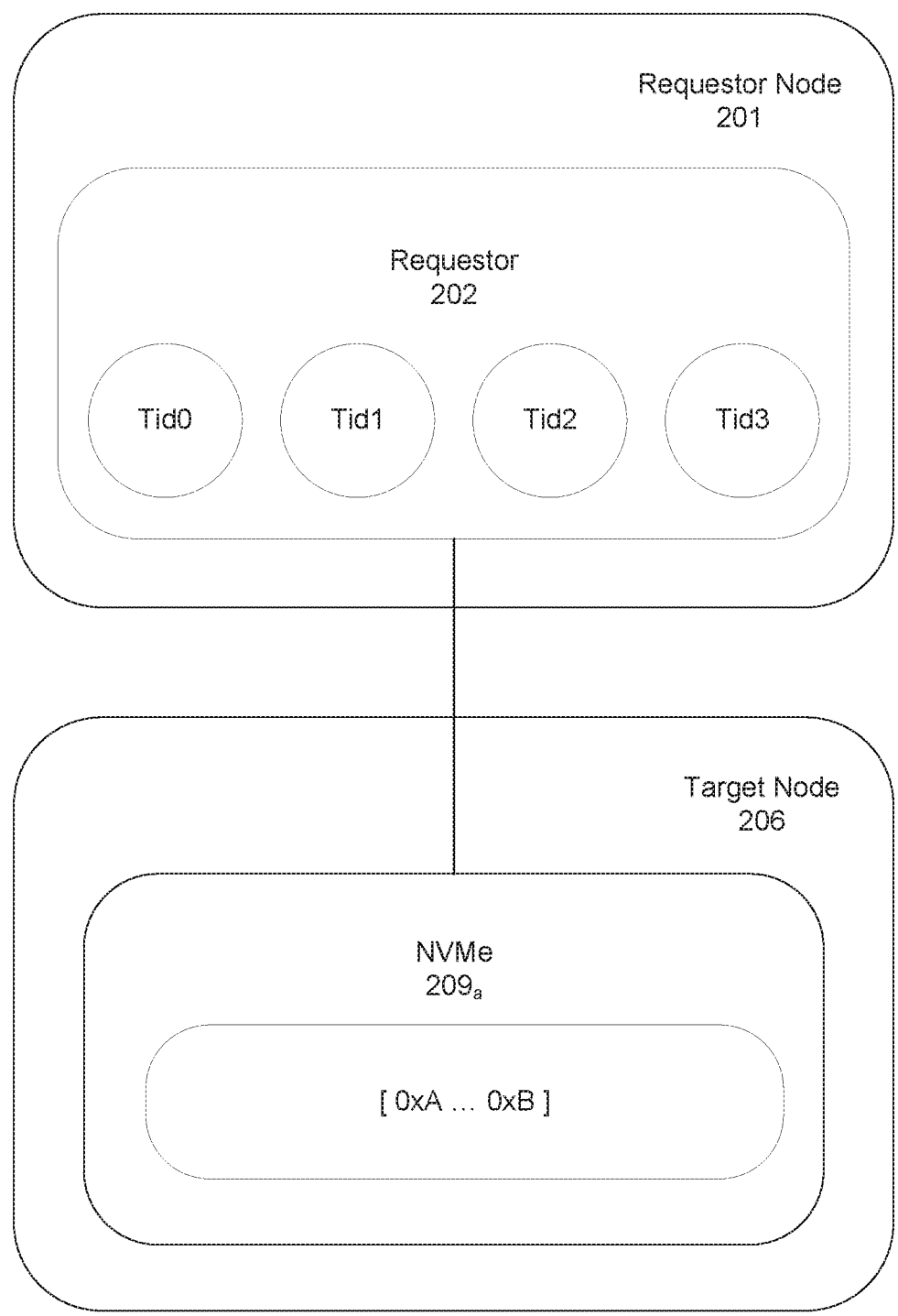
FIG. 3 shows a first logical representation of an operation between a requestor node and a target node.

FIG. 3 shows a first logical representation of an operation 300 between a requestor node 201 and a target node 206. As shown in FIG. 3, requestor node 201 may include requestor 202, whereas target node 206 may include device $209_a$. Where previously described, one or more aforementioned aspects of such elements may be incorporated with respect to FIG. 3, either individually, collectively, or any combination thereof. Although requestor node 201, requestor 202, target node 206, device $209_a$ are illustrated in FIG. 3, some aspects may employ additional or different requestor nodes 201, requestors 202, target nodes 206, devices and/or other elements.

With continued reference to FIG. 3, requestor node 201 may interact with one or more applications. According to at least one aspect, requestor node 201 may be configured to execute an application. Requestor node 201 may, in some aspects, may be coupled to another node or device configured to execute an application. In either case, if an application has data stored on one or more storage devices (e.g., persistent storage 128, SSD 140, etc.) supported by device $209_a$, requestor node 201 access may be more heavily trained at device $209_a$. In some cases, this behavior may be particularly true over intervals of time referred to as program phases.

With continued reference to FIG. 3, requestor node 201 may be configured to generate one or more threads $Tid_0$-$Tid_3$. In some aspects, requestor node 201 may be configured to generate one or more threads $Tid_0$-$Tid_3$ based on information from an application. According to at least one aspect, requestor node 201 may be configured to cache threads $Tid_0$-$Tid_3$ in requestor 202. Requestor node 201 may be configured to order threads $Tid_0$-$Tid_3$ in requestor 202. Requestor node 201 may be configured to generate one or more transactions based on the one or more threads $Tid_0$-$Tid_3$. One or more transactions may, in at least one aspect, be used to modify a particular range of address space of device $209_a$. For instance, modification may include overwriting values or writing values that will be queried nearby in time. According to some aspects, one or more transactions may, in at least one aspect, be used to read a particular range of address space of device $209_a$. For instance, one or more transactions may be used to read and modify a particular range of address space of device $209_a$ according to some aspects.

With continued reference to FIG. 3, requestor node 201 may include a interface 204. The interface of requestor node 201 may be configured to transmit the one or more threads $Tid_0$-$Tid_3$ over network 205 to target node 206 according to at least one aspect.

With continued reference to FIG. 3, target node 206 may include a interface and HW manager 208. The target node 206, in some aspects, may be configured to receive one or more transactions from the requestor node 201. According to at least one aspect, an interface of the target node 305 may be configured to receive one or more transactions from an interface of the requestor node 201.

With continued reference to FIG. 3, HW manager 208 of target node 206 may be configured to generate one or more commands based on the one or more transactions. The one or more commands may be defined according to an NVM Command Set. HW manager 208 of target node 206 may be configured to submit the one or more commands to a command queue for execution to control device $209_a$. For instance, HW manager 208 may be configured to submit a command through a register interface to device $209_a$. According to some aspects, the HW manager 208 may be configured to receive a notification of the completion of one or more commands through a completion queue.

According to some aspects, when an application is writing to different ranges of address space in device $209_a$, it is possible that each range of address space may have a different priority, respectively. If each range of address space of device $209_a$ is treated equally by requestor node 201, priority information associated with one or more threads $Tid_0$-$Tid_3$ may be lost. Accordingly, this methodology may result in a non-optimal usage of the network storage architecture. Therefore, utilization of the network storage architecture may be improved, in some aspects, by flushing one or more threads $Tid_0$-$Tid_3$ from the requestor 202 based on a priority associated with the range of address space of an NVMe and/or the entire set of NVMe devices.

In at least one aspect, improvement of the network storage architecture may be realized through the optimization of write operations. Write operations may, in some aspects, be enhanced in terms of memory consumption and read performance by implementing a delta merge scheme in accordance with some aspects. For instance, the use of one or more delta merge schemes in the HFI of an NVMeoF may optimize how the NVMe device is used. By contrast, read operations may result in decreased performance as a result of a delta merge scheme. The tradeoff in read operation performance may mitigated by implementing some aspects described herein. Accordingly, the delta merge schemes may, in some aspects, optimize write operations performance and mitigate read operation performance.

Utilization of the network storage architecture may, in some aspects, be enriched based on telemetry data. According to at least one aspect, one or more nodes of the network 205 may be configured to generate may generate telemetry data. For instance, one or more nodes of the network 205 may be configured to perform measurement(s) and/or calculation(s) to generate the telemetry data. According to some aspects, telemetry data may be generated and/or measured by the node(s) and/or entit(ies) to which it refers. In at least one aspect, telemetry data may be generated by and/or measured by the node(s) and/or entities different from the node(s) and/or entit(ies) to which the telemetry data refers. After generating telemetry data, one or more nodes may be configured to send telemetry data to one or more other nodes of network 205. Telemetry data may refer to the network 205, a requestor node, a target node, an intermediary device (e.g., switch) of network 205, an application, a combination thereof, one or more processes thereof and/or any interaction(s) therebetween. In some aspects, a node within the network storage architecture may optimize the timing of its data transfers based on telemetry data and/or a priority of a target address space.

Figure 4:
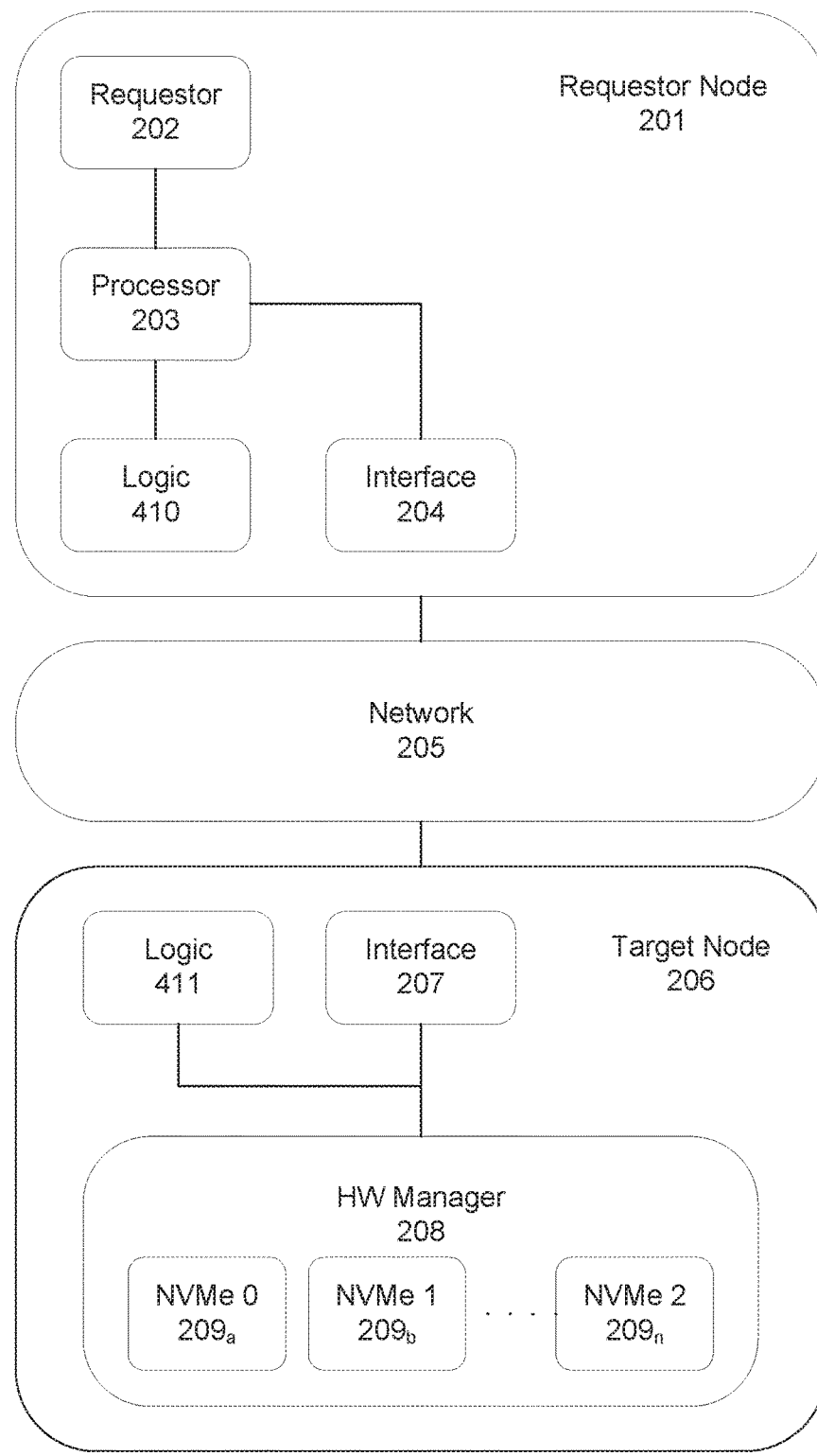
FIG. 4 shows a second exemplary networked storage architecture.

FIG. 4 shows a second exemplary networked storage architecture 400 according to some aspects. As shown in FIG. 4, the networked storage architecture 400 may include a requestor node 201, network 205, and target node 206. Where previously described, one or more aforementioned aspects of such elements may be incorporated with respect to FIG. 4, either individually, collectively, or any combination thereof. Although requestor node 201, network 205, and target node 206 are illustrated in FIG. 4, some aspects may employ additional and/or different requestor nodes 201, networks 205, target nodes 206, and/or other elements.

With continued reference to FIG. 4, requestor node 201 may include a requestor 202, a processor 203, interface 204 and logic 410. Where previously described, one or more aforementioned aspects of such elements may be incorporated with respect to FIG. 3, either individually, collectively, or any combination thereof. Although requestor 202, processor 203, interface 204, and logic 410 are illustrated in FIG. 4, some aspects may employ additional and/or different requestors 202, processors 203, interfaces 204, and logic 410, and/or other elements.

With continued reference to FIG. 4, logic 410 may, in some aspects, be included in a storage device (e.g., store code 129 of FIG. 1) of the requestor node 201. While graphically depicted as a single unit, logic 410 may be parsed into different subsets, such as $410_a$ . . . $410_n$.

With continued reference to FIG. 4, target node 206 may include interface 207, HW manager 208, one or more devices $209_a$-$209_n$, and logic 411. Where previously described, one or more aforementioned aspects of such elements may be incorporated with respect to FIG. 3, either individually, collectively, or any combination thereof. Although interface 207, HW manager 208, one or more devices $209_a$-$209_n$, and logic 411 are illustrated in FIG. 4, some aspects may employ additional and/or, interfaces 207, HW managers 208, one or more devices $209_a$-$209_n$, and logic 411, and/or other elements.

With continued reference to FIG. 4, logic 411 may, in some aspects, be included in a storage device (e.g., store code 129 of FIG. 1) of the target node 206. While graphically depicted as a single unit, logic 411 may be parsed into different subsets, such as $411_a$ . . . $411_n$.

With continued reference to FIG. 4, logic 410 of the requestor node 201 may include a set of processor executable instructions, which when executed by processor 203 causes processor 203 to perform one or more operations. In some aspects, the one or more operations may include assigning a priority level to one or more ranges of address space of the one or more devices $209_a$-$209_n$. According to at least one aspect, the one or more operations may include determining one or more priority levels associated with one or more threads $Tid_0$-$Tid_3$. The one or more operations may, in some aspects, include modifying one or more priority levels. In at least one aspect, the one or more operations may include a data transfer between the requestor node 201 to the target node 206 in a first operation mode. According to some aspects, the one or more operations may include a data transfer between the requestor node 201 and the target node 206 in a second operation mode. The one or more operations may include switching between the first operation mode and the second operation mode based on telemetry data, in accordance with at least one aspect. Although specific implementations of logic 410 are described with respect to FIG. 2, the present disclosure is not necessarily limited to these aspects.

With continued reference to FIG. 4, the one or more operations may, for instance, include determining a priority level associated with thread $Tid_0$. In some aspects, the determining of a priority level associated with thread $Tid_0$ may be based on an address space of a storage device. According to at least one aspect, the storage device may be one or more storage devices (e.g., persistent storage 128, SSD 140, etc.) supported by device $209_a$. The address space of the storage device to which thread $Tid_0$ pertains may, in some aspects, be identified based on thread $Tid_0$ and/or inferred based on data associated therewith.

With continued reference to FIG. 4, the one or more operations may include determining a priority level associated with thread $Tid_0$ based on one or more tables. In some aspects, the one or more operations may include comparing the address space to which thread $Tid_0$ pertains with the one or more tables. According to at least one aspect, determining a priority level may, for instance, include reading the priority level from a location of the one or more tables. The one or more tables may be stored within the requestor node 201, the network 205, target node 206, and/or other entity.

With continued reference to FIG. 4, the one or more operations may include determining a priority level associated with thread $Tid_0$ based on one or more ranges of address space of one or more storage device. In some aspects, the one or more storage devices may refer to the one or more storage devices supported by the one or more devices $209_a$-$209_n$. According to at least one aspect, the one or more ranges of address space may be stored in the requestor node 201, the network 205, target node 206, and/or other device. For instance, the one or more ranges of address space may, in some aspects, be stored in the one or more tables.

Although specific implementations of determining a priority level associated with one or more threads $Tid_0$-$Tid_3$ have been described, the present disclosure is not necessarily limited to these aspects. Some aspects may employ additional and/or different applications, operations, process, routines, and/or subroutines, etc for determining a priority level associated with one or more threads $Tid_0$-$Tid_3$.

With continued reference to FIG. 4, a priority level may be associated with one or more threads $Tid_0$-$Tid_3$ in various manners. In some aspects, one or more priority levels associated with one or more threads $Tid_0$-$Tid_3$ are static. According to at least one aspect, one or more one or more priority levels associated with one or more threads $Tid_0$-$Tid_3$ are dynamic.

With continued reference to FIG. 4, the one or more operations may include modifying one or more priority levels associated with one or more threads $Tid_0$-$Tid_3$. In some aspects, the one or more operations may include modifying one or more priority levels associated with one or more threads $Tid_0$-$Tid_3$ based on a threshold. According to at least one aspect, the one or more operations may include setting the threshold to avoid starvation within requestor 202. The one or more operations may, in some aspects, include setting the threshold to promote fairness within requestor 202. According to some aspects, modifying one or more priority levels may permit the one or more threads $Tid_0$-$Tid_3$ to be flushed proportionally to the rate at which one or more ranges of address space are accessed.

With continued reference to FIG. 4, the one or more operations may include modifying one or more priority levels associated with one or more threads $Tid_0$-$Tid_3$ based on a number of threads in requestor 202. In some aspects, modifying the one or more priority levels may include increasing one or more priority levels associated with one or more threads $Tid_0$-$Tid_3$ when the number of threads in the requestor 202 is less than or equal to the threshold. According to at least one aspect, modifying the one or more priority levels may include increasing one or more priority levels associated with one or more threads $Tid_0$-$Tid_3$ when the number of threads in the requestor 202 is greater than or equal to the threshold. Modifying the priority levels may, in some aspects, include decreasing the one or more priority levels associated with one or more threads $Tid_0$-$Tid_3$ when a number of threads in the requestor 202 is less than or equal to the threshold. Modifying the priority levels, in accord with at least one aspect, include decreasing the one or more priority levels associated with one or more threads $Tid_0$-$Tid_3$ when a number of threads in the requestor 202 is greater than or equal to the threshold.

With continued reference to FIG. 4, the one or more operations may include modifying one or more priority levels associated with one or more threads $Tid_0$-$Tid_3$ based on the duration in which one or more threads is in requestor 202. In some aspects, modifying the one or more priority levels may include increasing the one or more priority levels associated with one or more threads $Tid_0$-$Tid_3$ when one or more threads $Tid_0$-$Tid_3$ have been in the requestor 202 for a duration less than or equal to the threshold. According to at least one aspect, modifying the one or more priority levels may include increasing one or more priority levels associated with one or more threads $Tid_0$-$Tid_3$ when one or more threads $Tid_0$-$Tid_3$ have been in the requestor 202 for a duration greater than or equal to the threshold. Modifying the one or more priority levels may, in some aspects, include decreasing the one or more priority levels associated with one or more threads $Tid_0$-$Tid_3$ when one or more threads $Tid_0$-$Tid_3$ have been in the requestor 202 for a duration less than or equal to the threshold. Modifying the one or more priority levels may, in accord with at least one aspect, include decreasing the one or more priority levels associated with one or more threads $Tid_0$-$Tid_3$ when one or more threads $Tid_0$-$Tid_3$ have been in the requestor 202 for a duration greater than or equal to the threshold.

With continued reference to FIG. 4, the number of threads in the requestor 202 may, in some aspects, refer to a total number of threads in the requestor 202. In at least one aspect, a number of threads associated with a priority level that is greater than or equal to a threshold priority level. According to some aspects, the number of threads in the requestor 202 may refer to a number of threads associated with a priority level that is less than or equal to a threshold priority level.

With continued reference to FIG. 4, the one or more operations may include modifying one or more priority levels associated with one or more threads $Tid_0$-$Tid_3$ based on how frequently the data referenced therefrom is accessed. In some aspects, modifying the one or more priority levels may include increasing one or more priority levels associated with one or more threads $Tid_0$-$Tid_3$ when data referenced by one or more threads $Tid_0$-$Tid_3$ have been accessed a number of times less than or equal to the threshold. According to at least one aspect, modifying the one or more priority levels may include increasing one or more priority levels associated with one or more threads $Tid_0$-$Tid_3$ when one or more threads $Tid_0$-$Tid_3$ have been in the requestor 202 for a duration greater than or equal to the threshold. Modifying the one or more priority levels may, in some aspects, include decreasing the one or more priority levels associated with one or more threads $Tid_0$-$Tid_3$ when one or more threads $Tid_0$-$Tid_3$ have been in the requestor 202 for a duration less than or equal to the threshold. Modifying the one or more priority levels may, in accord with at least one aspect, include decreasing the one or more priority levels associated with one or more threads $Tid_0$-$Tid_3$ when one or more threads $Tid_0$-$Tid_3$ have been in the requestor 202 for a duration greater than or equal to the threshold.

With continued reference to FIG. 4, the one or more operations may include modifying one or more priority levels associated with one or more threads $Tid_0$-$Tid_3$ based on an aggregate priority level in the requestor 202. In this regard, the one or more operations may include aggregating the priority level(s) of the one or more threads $Tid_0$-$Tid_3$ in the requestor 202. In some aspects, modifying the one or more priority levels may include increasing one or more priority levels associated with one or more threads $Tid_0$-$Tid_3$ when the aggregate priority level data is less than or equal to the threshold. According to at least one aspect, modifying the one or more priority levels may include increasing one or more priority levels associated with one or more threads $Tid_0$-$Tid_3$ when the aggregate priority level data is greater than or equal to the threshold. Modifying the one or more priority levels may, in some aspects, include decreasing the one or more priority levels associated with one or more threads $Tid_0$-$Tid_3$ when the aggregate priority level data is less than or equal to the threshold. Modifying the one or more priority levels may, in accord with at least one aspect, include decreasing the one or more priority levels associated with one or more threads $Tid_0$-$Tid_3$ when the aggregate priority level data is greater than or equal to the threshold.

Although specific implementations of modifying a priority level associated with one or more threads $Tid_0$-$Tid_3$ have been described, the present disclosure is not necessarily limited to these aspects. Some aspects may employ additional and/or different applications, operations, process, routines, and/or subroutines, etc. for modifying a priority level associated with one or more threads $Tid_0$-$Tid_3$. According to at least one aspect, the one or more operations may include modifying priority level(s) associated with one or more threads $Tid_0$-$Tid_3$ based on one or more of the described thresholds and/or other criteria.

With continued reference to FIG. 4, the one or more operations may, for instance, include a data transfer from requestor node 201 to target node 206 in a first operation mode. In some aspects, the one or more operations includes a data transfer from one or more storage devices of requestor node 201 to one or more storage device target node 206 in the first operation mode. According to at least one aspect, the one or more operations includes a data transfer of a first type of data from one or more storage devices of requestor node 201 to one or more storage devices of target node 206 in the first operation mode. The first type of data, in some aspects, may be associated with a first range of address space of the one or more storage devices of the target node 206.

With continued reference to FIG. 4, the first range of address space of the one or more storage devices of the target node 206 may be different from a second range of address space of the one or more storage devices of the target node 206. In some aspects, the first range of address space of the one or more devices of the target node 206 may be mutually exclusive from the second range of address space of the one or more storage devices of the target node 206. According to at least one aspect, the first range of address space of the one or more devices of the target node 206 may overlap with the second range of address space of the one or more storage devices of the target node 206. For instance, the first range of address space of the one or more devices of the target node 206 may, in some aspects, include the second range of address space of the one or more storage devices of the target node 206.

With continued reference to FIG. 4, the data transfer of the first type of data from one or more storage devices of requestor node 201 to one or more storage devices of target node 206 in the first operation mode may be an optimized write operation, such as a delta merge operation. In some aspects, the first operation mode may refer to a delta merge operation for the first type of data.

With continued reference to FIG. 4, the delta merge operation may include buffering write requests for the first type of data in a buffer within the requestor node 201. In some aspects, the buffer may be implemented as a first-in-first-out (FIFO) buffer. According to at least one aspect, the write-optimized buffer may, in some aspects, implement a delta structure. The delta structure may, in some aspects, be an uncompressed, column-orientated data structure according to some aspects. In at least one aspect, the delta structure may be compressed based on a dictionary compression algorithm. According to some aspects, the delta structure may be a non-volatile structure configured to ensure data will persist in the buffer during a power failure.

With continued reference to FIG. 4, the buffer may, for instance, be a content addressable memory (CAM) (e.g., associative memory) that is configured to facilitate lookup for particular address blocks and target device identification (e.g., NVM_IDS). Upon receipt of input search data (e.g., a tag, word, etc.), the CAM may, in some aspects, be configured to compare the input search data with a table of stored data and return one or more address matching the input search data.

In at least one aspect, the first operation mode may refer to a delta merge operation for the first type of data.

With continued reference to FIG. 4, the first operation mode may be performed when a first data transfer criteria is met. In some aspects, the first data transfer criteria may be based on telemetry data. According to at least one aspect, the first data transfer criteria may be met when telemetry data indicates a utilization of one or more resources greater than or equal to a first threshold utilization. The first data transfer criteria may, in some aspects, be met when telemetry data indicates a utilization of one or more resources less than or equal to a second threshold utilization. In at least one aspect, the first data transfer criteria may be met when telemetry data indicates a utilization of one or more resources greater than or equal to the first threshold utilization (e.g., 0%, 0%±0.5%, etc.) and/or less than or equal to the second threshold utilization (e.g., 25%, 30%, 35%, etc.) utilization of one or more resources. In some aspects, the telemetry data compared to the first threshold utilization and the second threshold utilization may refer to the same one or more resources, different resource(s), or any combination thereof.

Although specific implementations of a data transfer from requestor node 201 to target node 206 in the first operation mode have been described, the present disclosure is not necessarily limited to these aspects. Some aspects may employ additional and/or different applications, operations, process, routines, and/or subroutines, etc. for transferring data from requestor node 201 to target node 206 in the first operation. According to at least one aspect, the first threshold utilization and/or second threshold utilization may be configured by a software stack in requestor node 201.

With continued reference to FIG. 4, the one or more operations may, for instance, include a data transfer from requestor node 201 to target node 206 in a second operation mode. In some aspects, the one or more operations includes a data transfer from one or more storage devices of requestor node 201 to one or more storage device target node 206 in the second operation mode. According to at least one aspect, the one or more operations includes a data transfer of a second type of data from one or more storage devices of requestor node 201 to one or more storage devices of target node 206 in the second operation mode. The second type of data, in some aspects, may be associated with a second range of address space of the one or more storage devices of the target node 206 that different from the first range of address space.

With continued reference to FIG. 4, the one or more operations may, for instance, include a data transfer from requestor node 201 to target node 206 in the second operation mode. In some aspects, the data transfer from the requestor node 201 to the target node 206 in a second operation mode may be an optimized write operation, such as a delta merge operation. According to at least one aspect, the delta merge operation may include buffering write requests for the second type of data in a buffer. The buffer may, in some aspects, be the same buffer used to store write requests for the first type of data. The second operation mode may refer to a delta merge operation for the second type of data in accord with at least one aspect.

With continued reference to FIG. 4, the second operation mode may, for instance, be performed when the second data transfer criteria is met. In some aspects, the second data transfer criteria may be met when telemetry data indicates a utilization of one or more resources is greater than or equal to the second threshold utilization. According to at least one aspect, the second data transfer criteria may be met when telemetry data indicates a utilization of one or more resources is greater than or equal the second threshold utilization (e.g., 25%, 30%, 35%, etc.). The second data transfer criteria may, in some aspects, be met when telemetry data indicates a utilization of one or more resources that is less than or equal to a third threshold utilization of the one or more resources (e.g., 75%, 85%, 95%, etc.). In at least one aspect, the second data transfer criteria may be met when telemetry data indicates a utilization of one or more resources that is greater than or equal to the second threshold utilization (e.g., 25%, 30%, 35%, etc) and/or less than or equal to the third threshold utilization (e.g., 75%, 85%, 95%, etc.) utilization of the one or more resources. In some aspects, the telemetry data compared to the second threshold utilization and the third threshold utilization may refer to the same one or more resources, different resource(s), or any combination thereof.

Although specific implementations of a data transfer from requestor node 201 to target node 206 in the second operation mode have been described, the present disclosure is not necessarily limited to these aspects. Some aspects may employ additional and/or different applications, operations, process, routines, and/or subroutines, etc. for transferring data from requestor node 201 to target node 206 in the second operation. According to at least one aspect, the second threshold utilization may be configured by a software stack in requestor node 201.

With continued reference to FIG. 4, the one or more operations may, for instance, include switching between the first operation mode and the second operation mode based on telemetry data. In some aspects, switching between the first operation mode and the second operation mode may be performed when the second data transfer criteria is met. According to at least one aspect, switching between the first operation mode and the second operation mode may include switching from the first operation mode to the second operation mode. Switching between the first operation mode and the second operation mode may, in some aspects, include switching from the second operation mode to the first operation mode.

With continued reference to FIG. 4, switching between the first operation mode and the second operation mode may be performed based on one or more events. In some aspects, an event may include signaling generated internally within requestor node 201 and/or signaling generated external to requestor node 201. According to at least one aspect, signaling be generated by requestor node 201, entity of the node of network 205 and/or one or more other entities. Requestor node 201 may be configured to receive signaling when it is generated external to requestor node 201.

With continued reference to FIG. 4, switching between the first operation mode and the second operation mode may, for instance, include evaluating whether the first data transfer criteria and/or the second data transfer criteria is met based the one or more events. In some aspects, evaluating whether the first data transfer criteria and/or second data transfer criteria is met is performed in response to application signaling. According to at least one aspect, signaling may be based on an alarm, user input, an optimization algorithm, customer storage application and/or expiration of one or more predetermined durations, etc. Predetermined durations may, in some aspects, be modified in accordance with at least one aspect. For instance, one or more predetermined durations may, in some aspects, be modified by the software stack of the requestor node 201 in accordance with at least one aspect.

With continued reference to FIG. 4, the one or more operations may include evaluating whether the first data transfer criteria is met at one or more predetermined intervals in accordance with some aspects. In some aspects, the one or more predetermined intervals at which the first data transfer criteria is evaluated may correspond to the one or more predetermined intervals at which telemetry data is acquired. According to some aspects, the one or more predetermined intervals at which the first data transfer criteria is evaluated may be an integer multiple of the one or more predetermined intervals at which telemetry data is acquired. The one or more predetermined intervals at which the first data transfer criteria is evaluated may, in some aspects, be a non-integer multiple of the one or more predetermined intervals at which telemetry data is acquired. In at least one aspect, one or more predetermined intervals at which the first data transfer criteria is evaluated may be an integer multiple of the one or more predetermined intervals at which telemetry data is acquired. Predetermined intervals maybe reconfigured by the software stack of the requestor node 201 in accordance with at least one aspect.

Although specific implementations of switching between the first operation mode and the second operation mode have been described, the present disclosure is not necessarily limited to these aspects. Some aspects may employ additional and/or different applications, operations, process, routines, and/or subroutines, etc. for switching between the first operation mode and the second operation.

Figure 5:
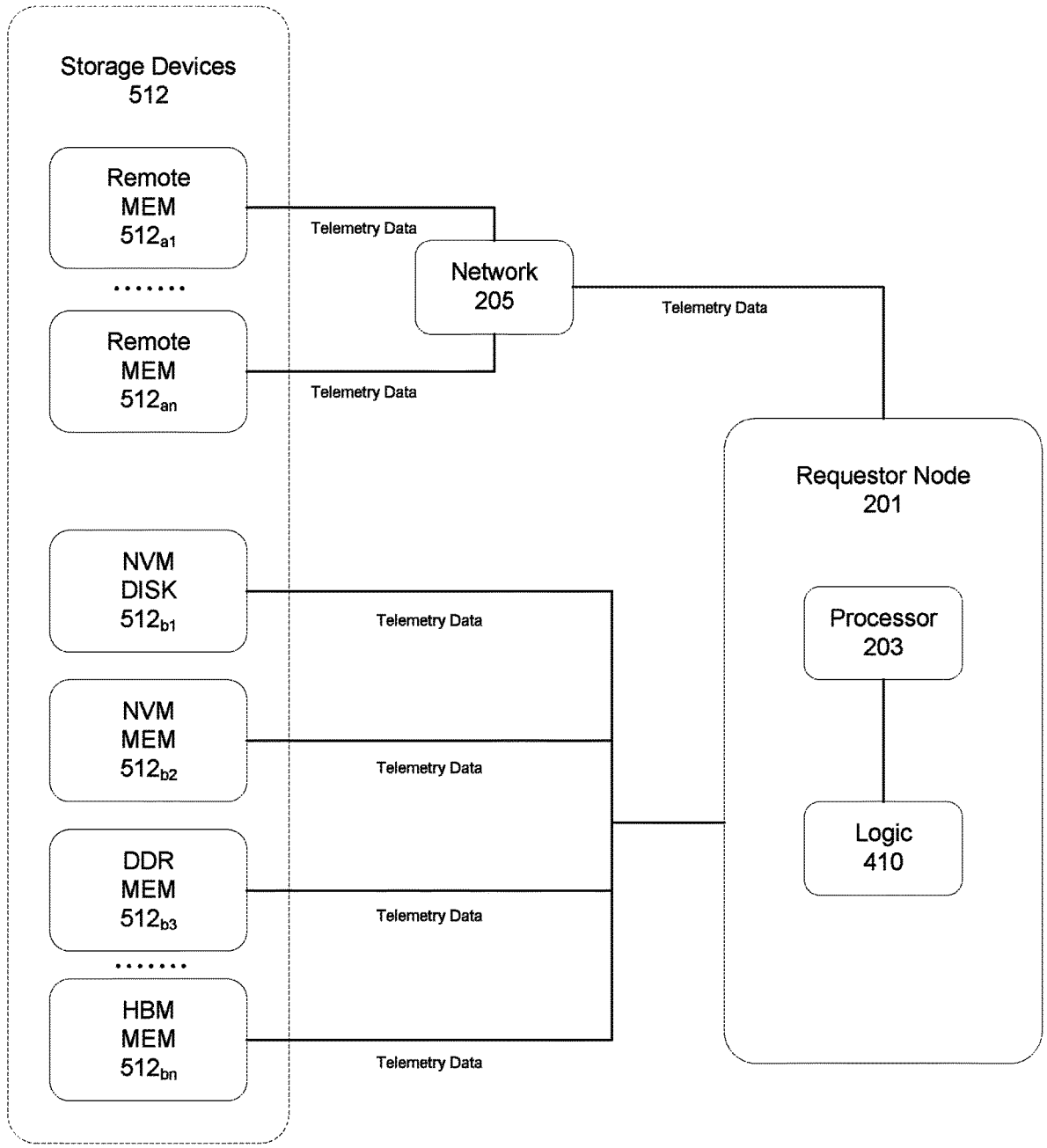
FIG. 5 shows a third exemplary networked storage architecture.

FIG. 5 shows a third exemplary networked storage architecture 500 according to some aspects. As shown in FIG. 5, the networked storage architecture 500 may include a requestor node 201, network 205, and one or more storage devices 512. Where previously described, one or more aforementioned aspects of such elements may be incorporated with respect to FIG. 5, either individually, collectively, or any combination thereof. Although requestor node 201, network 205, and one or more storage devices 512 are illustrated in FIG. 5, some aspects may employ additional and/or different requestor nodes 201, networks 205, one or more storage devices 512, and/or other elements.

With continued reference to FIG. 5, requestor node 201 may include processor 203 and logic 410. Where previously described, one or more aforementioned aspects of such elements may be incorporated with respect to FIG. 5, either individually, collectively, or any combination thereof. Although processor 203 and logic 410 are illustrated within requestor node 201 of FIG. 5, some aspects may employ additional and/or different processors 203, and logic 410, and/or other elements.

With continued reference to FIG. 5, one or more storage devices 512 may include remote memory $512_{a1}$, remote memory $512_{an}$, non-volatile memory (NVM) disk $512_{b1}$, NVM $512_{b2}$, double data rate (DDR) memory $512_{b3}$, high bandwidth memory (HBM) $512_{bn}$. In some aspects, remote memory $512_{a1}$ may correspond to one or more storage devices supported by one or more devices $208_a$-$208_n$ of the target node 206. According to some aspects, remote memory $512_{a1}$ may correspond to one or more storage devices of another entity on network 205. Requestor node 201 may, in some aspects, include NVM disk $512_{b1}$, NVM $512_{b2}$, double data rate (DDR) memory $512_{b3}$, and/or high bandwidth memory (HBM) $512_{bn}$. Although remote memory $512_{a1}$, remote memory $512_{an}$, NVM disk $512_{b1}$, NVM $512_{b2}$, DDR memory $512_{b3}$, and HBM $512_{bn}$ are illustrated within one or more storage devices 512 of FIG. 5, some aspects may employ additional and/or different remote memory $512_{a1}$, remote memory $512_{an}$, NVM disk $512_{b1}$, NVM $512_{b2}$, DDR memory $512_{b3}$, and HBM $512_{bn}$, memory elements and/or other elements.

With continued reference to FIG. 5, requestor node 201 may be configured to receive telemetry data from the one or more storage devices 512. In some aspects, requestor node 201 is configured to receive telemetry data from the one or more storage devices 521 via network 205. Additionally or alternatively, requestor node 201 may be configured to receive telemetry data from a node (e.g., telemetry data server) via network 205. According to at least one aspect, processor 203 may be configured to receive telemetry data via network 205. Processor 203, in some aspects, is configured to receive telemetry data via general purpose serial communication bus 120, storage protocol bus 121, low bandwidth bus 122, and/or memory interconnect 182. For instance, a DMA engine included in processor 203 may, in some aspects, be configured to receive telemetry data from the one or more storage devices 512.

Although specific implementations of receiving telemetry data have been described, the present disclosure is not necessarily limited to these aspects. Some aspects may employ additional and/or different applications, operations, process, routines, and/or subroutines, etc. for receiving telemetry data.

With continued reference to FIG. 5, telemetry data may be associated with at least one of the one or more storage devices of the requestor node 201, the one or more storage devices of the target node 206, and/or one or more storage devices of a node on network 205, etc. In some aspects, telemetry data may include telemetry data of the of the requestor node 201. According to at least one aspect, telemetry data may include telemetry data of the target node 506. Telemetry data may, in some aspects, include telemetry data of the network 205. In at least one aspect, telemetry data may include telemetry data of the one or more storage devices of the requestor node 201, telemetry data of the one or more storage device of the target node 206, and/or telemetry data of the network. One or more nodes of network 205 may be configured to aggregate (e.g., average over a predetermined interval) telemetry data for the one or more storage devices of the requestor node 201, telemetry data of the target node 206, and/or telemetry data of the network 205, individually, collectively or any combination thereof.

With continued reference to FIG. 5, telemetry data may include various types of information, such as bandwidth information, power information, latency information, CPU utilization information, memory utilization information, and/or predictive interference information, etc. In some aspects, bandwidth information may include network bandwidth information, fabric bandwidth information, interface read/write bandwidth information, and/or I/O read/write bandwidth information, etc. According to at least one aspect, power information may include voltage information, current information, real power information, apparent power information, and/or power factor information, etc. Latency information may, in some aspects, include one-way transmission latency information, round-trip transmission latency information, intermediary device latency information, processing latency information, and/or hardware reaction latency information, etc. Predictive interference information may include predictive access information in accord with at least one aspect.

With continued reference to FIG. 5, telemetry data may have timing information associated therewith. In some aspects, timing information may refer to past timing information, present timing information and/or future timing information. Timing information may be defined with respect to the network, a requestor node, a target node, an intermediary device of the network, an application and/or process thereof, etc. Timing information may indicate a start time information, an end time information, time interval information, and/or periodicity information, etc.

Although specific implementations of telemetry data between the have been described, the present disclosure is not necessarily limited to these aspects. Some aspects may employ additional and/or different information within telemetry data.

With continued reference to FIG. 5, logic 410 of the requestor node 201 may include a set of processor executable instructions, which when executed by processor 203 causes processor 203 to perform one or more operations. In addition to the one or more operations described herein, the one or more operations may, in some aspects, include the one or more operations may include setting a first threshold utilization. According to at least one aspect, the one or more operations may include setting a second threshold utilization. The one or more operations may, in some aspects, include setting a third threshold utilization. The first threshold utilization, second threshold utilization and/or third threshold utilization may, in some aspects, be based on one or more configurations. In at least one aspect, the one or more configurations may be adapted by one or more default configurations (e.g., preset by a manufacturer), one or more nodes of the network 205 (e.g., protocol stack of the requestor node 201), a remote application (e.g., customer storage application), and/or a remote telemetry data server, etc.

Although specific implementations of setting the first threshold utilization, the second threshold utilization, and/or the third threshold utilization have been described, the present disclosure is not necessarily limited to these aspects. Some aspects may employ additional and/or different applications, operations, process, routines, and/or subroutines, etc. for setting the first threshold utilization, the second threshold utilization, and/or the third threshold utilization.

With continued reference to FIG. 5, the one or more operations may include acquiring telemetry data from the one or more storage devices 512. In some aspects, the one or more operations may include acquiring telemetry data from the one or more storage devices 512 at a predetermined interval. According to at least one aspect, acquiring telemetry data from the one or more storage devices 512 may include modifying the predetermined interval at which telemetry data is acquired from the one or more storage devices 512.

Although specific implementations of acquiring telemetry data from the one or more storage devices 512 have been described, the present disclosure is not necessarily limited to these aspects. Some aspects may employ additional and/or different applications, operations, process, routines, and/or subroutines, etc. for acquiring telemetry data from the one or more storage devices 512.

With continued reference to FIG. 5, modifying the predetermined interval at which telemetry data is acquired from the one or more storage devices 512 may, for instance, be based on a time-averaged telemetry data level and/or a slope of a telemetry data level signal. In some aspects, modifying the predetermined interval at which telemetry data is acquired from the one or more storage devices 512 may include increasing or decreasing the predetermined interval based on the time averaged telemetry data meeting a first predetermined interval update threshold. According to at least one aspect, the first predetermined interval update threshold may be met when the time-average telemetry data level is greater than or equal to the first predetermined interval update threshold. The first predetermined interval update threshold may, in some aspects, be met when the time-average telemetry data level is less than or equal to the first predetermined interval update threshold.

With continued reference to FIG. 5, in at least one aspect, modifying the predetermined interval at which telemetry data is acquired from the one or more storage devices 512 may include increasing or decreasing the predetermined interval based on a slope of a telemetry data level signal meeting a second predetermined interval update threshold. In some aspects, the second predetermined interval update threshold may be met when the slope of a telemetry data level signal is greater than or equal to the second predetermined interval update threshold. According to at least one aspect, the first predetermined interval update threshold may be met when the time-average telemetry data level is less than or equal to the second predetermined interval update threshold.

Although specific implementations of modifying the predetermined interval at which telemetry data is acquired have been described, the present disclosure is not necessarily limited to these aspects. Some aspects may employ additional and/or different applications, operations, process, routines, and/or subroutines, etc. for modifying the predetermined interval at which telemetry data is acquired.

With continued reference to FIG. 5, the one or more storage operations may, in some aspects, may include computing one or more aggregate telemetry data level values based on telemetry data received from the one or more of the storage devices 512. In some aspects, computing one or more aggregate telemetry data level values may be performed for two or more of storage devices 512, individually. According to at least one aspect, computing one or more aggregate telemetry data level values may be performed for two or more storage devices 512, collectively. Computing the one or more aggregate telemetry data level values may, in some aspects, be performed for each of the storage devices 512, individually. In at least one aspect, computing the one or more aggregate telemetry data level values may be performed for each of the storage devices 512, collectively. According to some aspects, the one or more aggregate telemetry data levels may be one or more time-averaged telemetry data levels and/or one or more slopes of telemetry data level signal(s) for the one or more storage devices 512.

Although specific implementations of computing one or more aggregate telemetry data level values have been described, the present disclosure is not necessarily limited to these aspects. Some aspects may employ additional and/or different applications, operations, process, routines, and/or subroutines, etc. for computing one or more aggregate telemetry data level values.

With continued reference to FIG. 5, the one or more operations may, for instance, include determining whether the first data transfer criteria is met. In some aspects, determining whether the first data transfer criteria is met may include comparing telemetry data from one or more of the storage devices 512 with the first threshold utilization and/or the second threshold utilization. According to at least one aspect, determining whether the first data transfer criteria is met may include comparing one or more aggregate telemetry data level values with the first threshold utilization and/or the second threshold utilization.

Although specific implementations of determining whether the first data transfer criteria is met have been described, the present disclosure is not necessarily limited to these aspects. Some aspects may employ additional and/or different applications, operations, process, routines, and/or subroutines, etc. for determining whether the first data transfer criteria is met.

With continued reference to FIG. 5, the one or more operations may, for instance, include determining whether the second data transfer criteria is met. In some aspects, determining whether the second data transfer criteria is met may include comparing telemetry data from one or more of the storage devices 512 with the second threshold utilization and/or the third threshold utilization. According to at least one aspect, determining whether the first data transfer criteria is met may include comparing one or more aggregate telemetry data level values with the second threshold utilization and/or the third threshold utilization.

Although specific implementations of determining whether the second data transfer criteria is met have been described, the present disclosure is not necessarily limited to these aspects. Some aspects may employ additional and/or different applications, operations, process, routines, and/or subroutines, etc. for determining whether the second data transfer criteria is met.

With continued reference to FIG. 5, the one or more operations may, for instance, include a data transfer from requestor node 201 to target node 206 in a first operation mode. In some aspects, the data transfer from one or more storage devices of the requestor node 201 to one or more storage devices of the target node 206 in a first operation mode may be performed when to the first data transfer criteria is met. According to some aspects, one or more operations may, for instance, include the data transfer of a first type of data from one or more storage devices of requestor node 201 to one or more storage devices of target node 206 in the first operation mode in response to the first data transfer criteria being met.

Although specific implementations of performing a data transfer from requestor node 201 to target node 206 in a first operation mode have been described, the present disclosure is not necessarily limited to these aspects. Some aspects may employ additional and/or different applications, operations, process, routines, and/or subroutines, etc. for performing a data transfer from requestor node 201 to target node 206 in a first operation mode.

With continued reference to FIG. 5, the one or more operations may, for instance, include a data transfer from requestor node 201 to target node 206 in a second operation mode. In some aspects, the data transfer from one or more storage devices of the requestor node 201 to one or more storage devices of the target node 206 in a second operation mode may be performed when to the second data transfer criteria is met. According to some aspects, one or more operations may, for instance, include the data transfer of a second type of data from one or more storage devices of requestor node 201 to one or more storage devices of target node 206 in the second operation mode in response to the second data transfer criteria being met.

Although specific implementations of performing a data transfer from requestor node 201 to target node 206 in a second operation mode have been described, the present disclosure is not necessarily limited to these aspects. Some aspects may employ additional and/or different applications, operations, process, routines, and/or subroutines, etc. for performing a data transfer from requestor node 201 to target node 206 in a second operation mode.

Figure 6:
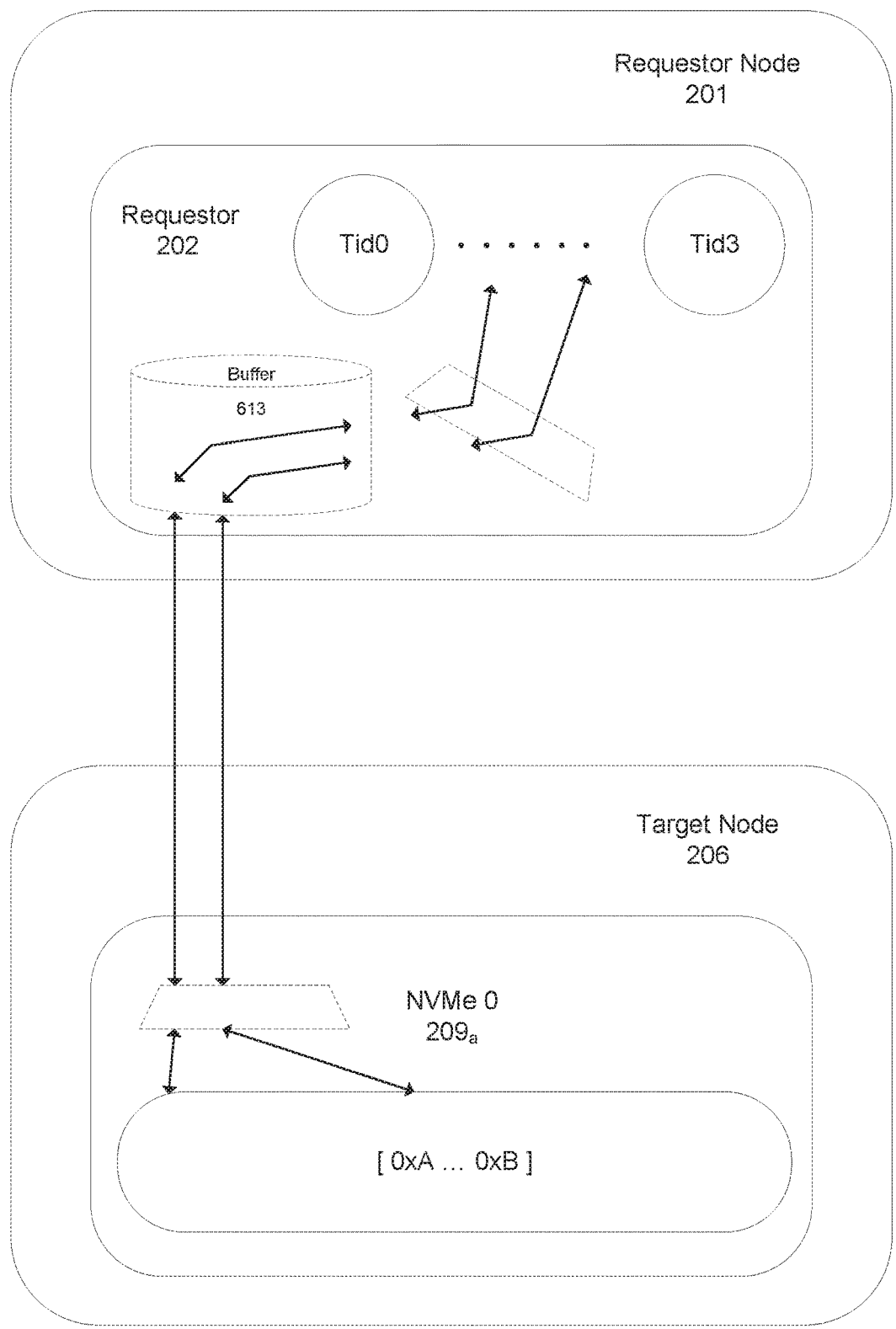
FIG. 6 shows a second logical representation of an operation between a requestor node and a target node.

FIG. 6 shows a second logical representation of an operation 600 between a requestor node 201 and a target node 206. Where previously described, one or more aforementioned aspects of such elements may be incorporated with respect to FIG. 6, either individually, collectively, or any combination thereof. Although requestor node 201 and target node 206 are illustrated in FIG. 6, some aspects may employ additional and/or different requestor nodes 201, target nodes 206, and/or other elements.

With continued reference to FIG. 6, requestor node 201 may include requestor 202, whereas target node 206 may include device $209_a$. Where previously described, one or more aforementioned aspects of such elements may be incorporated with respect to FIG. 6, either individually, collectively, or any combination thereof. Although requestor 202 and device $209_a$ are illustrated in FIG. 6, some aspects may employ additional and/or different requestors 202, devices, and/or other elements.

With continued reference to FIG. 6, requestor 202 may include one or more threads $Tid_0$-$Tid_3$ and buffer 613. Where previously described, one or more aforementioned aspects of such elements may be incorporated with respect to FIG. 6, either individually, collectively, or any combination thereof. According to at least one aspect, buffer 613 may correspond to the buffer within the requestor node 201 of FIG. 4. Although one or more threads $Tid_0$-$Tid_3$ and buffer 613 are illustrated in FIG. 6, some aspects may employ additional threads and/or buffers, and/or other elements.

With continued reference to FIG. 6, requestor node 201 may be configured to cache threads $Tid_0$-$Tid_3$ in requestor 202. Requestor node 201 may be configured to order threads $Tid_0$-$Tid_3$ in the buffer 613 for transmission in some aspects.

With continued reference to FIG. 6, buffer 613 may, for instance, be configured to buffer write transactions for the first type of data and/or second type of data. In some aspects, buffer 613 may be implemented as a FIFO. According to at least one aspect, buffer 613 may be implement a delta structure. The delta structure may, in some aspects, be an uncompressed, column-orientated data structure. In at least one aspect, the delta structure may be compressed based on a dictionary compression algorithm prior to transmission to one or more target nodes (e.g., target node 206). According to some aspects, the delta structure may be a non-volatile structure configured to ensure data will persist in the buffer during a power failure.

With continued reference to FIG. 6, buffer 613 may, for instance, be a content addressable memory (CAM) (e.g., associative memory) configured to facilitate lookup for particular address blocks and target device identification (e.g., NVM_IDS). Upon receipt of input search data (e.g., a tag, word, etc.), the CAM may, in some aspects, be configured to compare the input search data with a table of stored data and return one or more address matching the input search data.

With continued reference to FIG. 6, the requestor 202 may, for instance, be configured to receive one or more one or more threads $Tid_0$-$Tid_3$ from a compute platform of the requestor node 201. As described with respect to FIG. 3, each of the one or more threads $Tid_0$-$Tid_3$ may have a priority level associated therewith. In some aspects, logic within requestor node 201 may be configured to generate one or more transactions based on the one or more one or more threads $Tid_0$-$Tid_3$. According to at least one aspect, each transaction of the one or more transactions may be associated with a priority level based on the range of address space to which the transaction refers. Buffer 613 may, in some aspects, be configured to store the one or more transactions therein before transmission to the target node 206. In at least one aspect, each transaction of the one or more transactions may be organized within the buffer 613 according to the priority level associated therewith. According to some aspects, one or more transactions may include one or more write transactions and/or one or more read transactions. Write transactions may include one or more incremental write transactions in accordance with at least one aspect herein.

With continued reference to FIG. 6, requestor node 201 may, include processor 203 and logic 410. In some aspects, logic 410 may include a set of processor executable instructions, which when executed by a processor 203 causes the processor 203 to perform one or more operations.

With continued reference to FIG. 6, a priority level associated with each transaction of the one or more transactions based on the particular range of address space to which it refers. In some aspects, the priority level may be same priority level as the thread from which it was generated. According to at least one aspect, the priority level of each transaction may be determined and/or modified in the manner described with respect to FIG. 4.

With continued reference to FIG. 6, the one or more operations may, for instance, include determining a capacity level of the delta structure. In some aspects, determining the capacity level of the delta structure may be based on the number of transactions stored therein. According to at least one aspect, determining the capacity level of the delta structure may be based on the size of transactions stored therein. Determining the capacity level of the delta structure may, in some aspects, be based on the rate at which transactions stored are stored in the delta structure. In at least one aspect, the one or more operations may include performing a data transfer in at least one of the first operation mode or the second operation mode, when the capacity level of the delta structure meets a delta structure capacity criteria.

According to some aspects, the one or more operations may, for instance, include increasing the rate at which data is transferred in the second operation mode when the capacity level of the delta structure meets a delta structure capacity criteria.

With continued reference to FIG. 6, the one or more operations may, for instance, include performing a read transactions based on a thread. In some aspects, a write transaction may be logically represented as "Rd @NVM_Block, NVMe_ID." According to at least one aspect, a performing the read transaction may include determining whether the read transaction may be satisfied by the delta structure. Determining whether the read transaction may be satisfied by the delta structure may, in some aspects, include searching the delta structure for an address block (e.g., NVM_Block) being modified by one or more write transactions stored therein. In at least one aspect, searching the delta structure may, in some aspects, include searching the delta structure for an address block (e.g., NVM_Block) and device identification (e.g., NVMe_ID) indicated by the read transaction. According to some aspects, performing a read transaction may include returning a payload indicated by the read transaction from the delta structure when it is determined the read transaction may be satisfied by the delta structure.

With continued reference to FIG. 6, performing a read transaction may, for instance, include storing the read transaction in the delta structure, for transmission to the target node 206, when it is determined that the read transaction cannot be satisfied by the delta structure. In some aspects, performing the read transaction may include initializing access with target node 206 concurrently with determining whether the read transaction may be satisfied by the delta structure. According to at least one aspect, performing the read transaction may include initializing access with target node 206 concurrently with determining whether the read transaction may be satisfied by the delta structure when the read transactions indicates the first data type.

With continued reference to FIG. 6, performing the read transaction may, for instance, include initializing access with target node 206. In some aspects, performing the read transaction may include initializing access with the target node 206 concurrently with determining whether the read transaction may be satisfied by the delta structure when the read transaction is the second type of data. According to at least one aspect, performing a read transaction may include performing a data transfer of the read transaction to the target node 206 concurrently with initializing access with target node 206, where the read transaction is the second type of data. Performing a read transaction may, in some aspects, include performing a data transfer of the read transaction to the target node 206 prior to determining whether the read transaction can be satisfied by the delta structure, where the read transaction is the second type of data.

With continued reference to FIG. 6, the one or more operations may include performing a write transaction based on a thread. In some aspects, a write transaction may be logically represented as "Wr @NVM_Block, NVMe_ID, payload." According to at least one aspect, performing a write transaction may include determining whether any other write transactions in the delta structure target the same device identifier (e.g., NVMe_ID) and address block (e.g., NVMe_Block) as the write transaction. The one or more operations may, in some aspects, include merging the write transaction with the other write transaction targeting the same device identifier and address block. In at least one aspect, the one or more operations may include appending the write transaction to the tail of the delta structure when no other write transactions in the delta structure target the same device identifier and address block as the write transaction.

With continued reference to FIG. 6, merging the write transaction with the other write transaction targeting the same device identifier and address block may, for instance, include compressing the write transaction with the other write transaction into a fabric message. In some aspects, the one or more operations may include performing a data transfer of the fabric message from the delta structure to the target node 206 in a first operation mode when the message is the first data type. According to some aspects, the one or more operations may include performing a data transfer of the fabric message from the delta structure to the target node 206 in a second operation mode when the message is the second data type.

With continued reference to FIG. 6, a write transaction may indicate non-blending to maintain write ordering. In some aspects, the one or more operations may include appending the write transaction to the tail of the delta structure when one or more other write transactions in the delta structure target the same device identifier and address block as the write transaction, where the write transaction indicates non-blending.

With continued reference to FIG. 6, the one or more operations may include performing a data transfer of a stream of transactions from the delta structure to the target node 206. In some aspects, an HFI may be configured to process the stream of transactions to one or more devices of the target node.

With continued reference to FIG. 6, the one or more operations may include blending one or more incremental write transactions into one or more buffered blocks (e.g., pages) prior to transmission to the target node 506. The one or more operations may, in some aspects, include performing a data transfer of the one or more buffered blocks including the one or more incremental write transactions from the delta structure of the requestor node 201 to one or more storages devices of the target node 506 in the first operation mode when the one or more buffered blocks including the one or more incremental write transactions is the first type of data. In accordance with at least one aspect, the one or more operations may include performing a data transfer of the one or more buffered blocks including the one or more incremental writes from the delta structure of the requestor node 201 to one or more storage devices of the target node 506 in the second operation mode when the one or more buffered blocks including the one or more incremental writes is the second type of data.

With continued reference to FIG. 6, the one or more operations may, in some aspects, include grouping a plurality of incremental write transactions into one or more buffered blocks (e.g., pages) before being sent to the target node 506. In some aspects, the one or more operations may, in some aspects, include performing a data transfer of the one or more buffered blocks consisting of the plurality of incremental writes transactions from the delta structure of the requestor node 201 to one or more storages devices of the target node 506 in the first operation mode, where the one or more buffered blocks consist of the first type of data. According to at least one aspect, the one or more operations may include performing a data transfer of the one or more buffered blocks consisting of a plurality of incremental write transactions from the delta structure of the requestor node 201 to one or more storages devices of the target node 506 in the second operation mode, where the one or more buffered blocks consist of the second type of data.

With continued reference to FIG. 6, the one or more operations may, in some aspects, include grouping a plurality of write transactions into one or more continuous batches before being sent to the target node 506. In some aspects, the one or more operations may include performing a data transfer of the one or more continuous batches including the plurality of writes transactions from the delta structure of the requestor node 201 to one or more storages devices of the target node 506 in the first operation mode, where the one or more continuous batches include of the first type of data. According to at least one aspect, the one or more operations may include performing a data transfer of the one or more continuous batches consisting of the plurality of writes transactions from the delta structure of the requestor node 201 to one or more storages devices of the target node 506 in the first operation mode, where the one or more continuous batches include of the first type of data. The one or more operations may, in some aspects, include performing a data transfer of the one or more continuous batches consisting of a plurality of write transactions from the delta structure of the requestor node 201 to one or more storages devices of the target node 506 in the second operation mode, where the one or more continuous batches include the second type of data. In at least one aspect, the rate at which the data transfer of the one or more continuous batches is performed may be based on (a) telemetry data of the network (e.g., available NVMeoF fabric bandwidth), (b) capacity level of the buffer 613, and (c) compaction efficiency of one or more delta merge operations. According to some aspects, software can guide the hardware to locate a point of diminishing returns.

Figure 7:
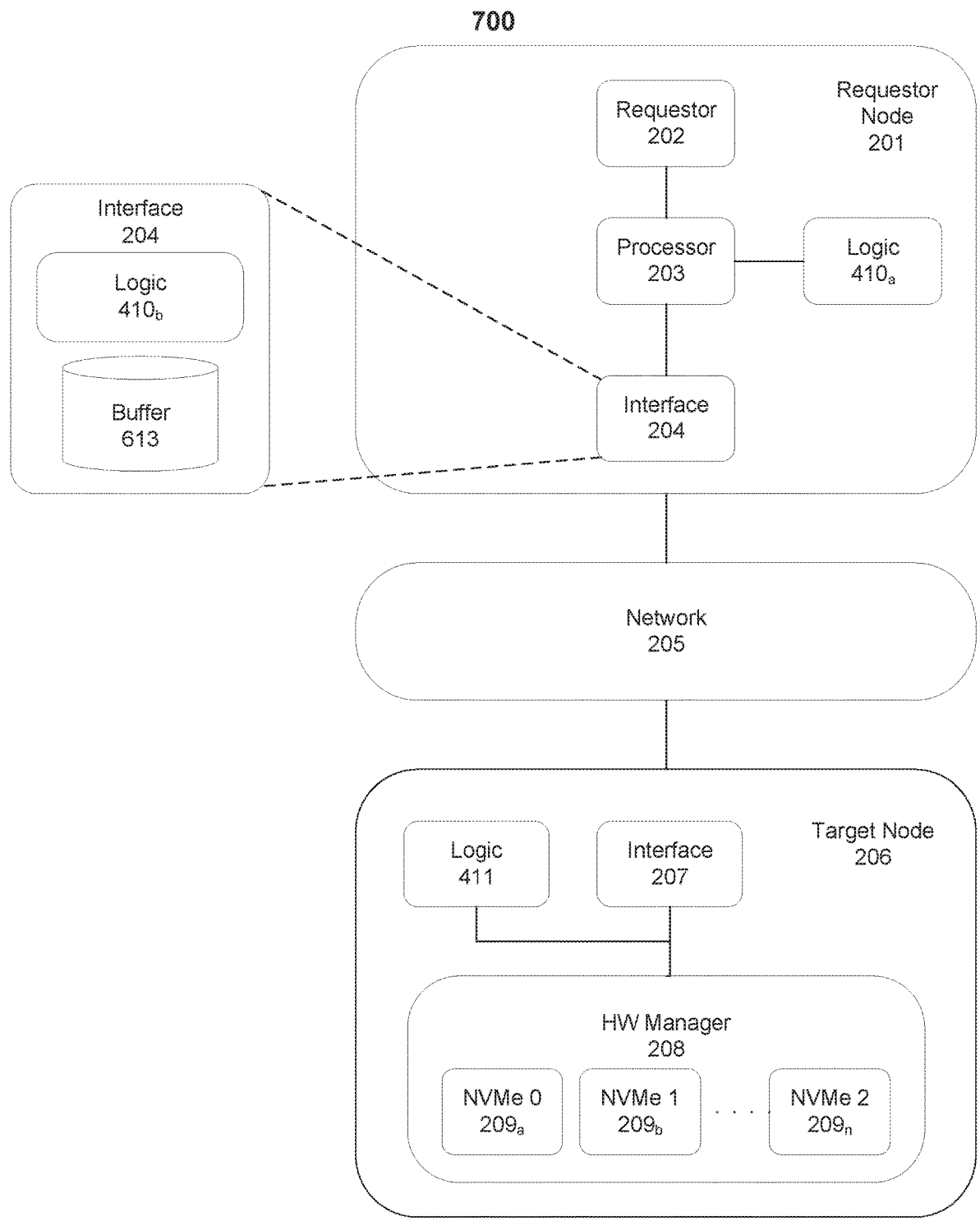
FIG. 7 shows a fourth exemplary networked storage architecture.

FIG. 7 shows a fourth exemplary networked storage architecture 700 according to some aspects. As shown in FIG. 7, the networked storage architecture 700 may include a requestor node 201, network 205, and target node 206. Where previously described, one or more aforementioned aspects of such elements may be incorporated with respect to FIG. 7, either individually, collectively, or any combination thereof. Although requestor 201, network 205, and target node 206 are illustrated in networked storage architecture 700 of FIG. 7, some aspects may employ additional and/or different requestor nodes, networks, target nodes, and/or other elements.

With continued reference to FIG. 7, requestor node 201 may include requestor 202, processor 203, interface 204, and logic $410_a$. Where previously described, one or more aforementioned aspects of such elements may be incorporated with respect to FIG. 7, either individually, collectively, or any combination thereof. Although requestor 202, processor 203, interface 204, and logic $410_a$ are illustrated in requestor node 201 of FIG. 7, some aspects may employ additional and/or different requestor 202, processor 203, interface 204, logic, and/or other elements.

With continued reference to FIG. 7, interface 204 may include logic 410b and buffer 613. Where previously described, one or more aforementioned aspects of such elements may be incorporated with respect to FIG. 7, either individually, collectively, or any combination thereof. In some aspects, logic 410b may include a set of processor executable instructions, which when executed by processor 203 causes processor 203 to perform one or more operations described herein. According to at least one aspect, the one or more operations may relate to an NVMeoF operation and/or a delta merge operation. Although logic 410b and buffer 613 are illustrated in interface 204 of FIG. 7, some aspects may employ additional and/or different logic, buffers 613, and/or other elements.

With continued reference to FIG. 7, target node 206 may include interface 207, HW manager 208 and logic 411. Where previously described, one or more aforementioned aspects of such elements may be incorporated with respect to FIG. 7, either individually, collectively, or any combination thereof. Although interface 207, HW manager 208 and logic 411 are illustrated in target node 206 of FIG. 7, some aspects may employ additional and/or different NICs 207, HW managers 208, and logic, and/or other elements.

With continued reference to FIG. 7, HW manager 208 may include devices $209_a$-$209_n$. Where previously described, one or more aforementioned aspects of such elements may be incorporated with respect to FIG. 7, either individually, collectively, or any combination thereof. Although devices $209_a$-$209_n$ are illustrated in HW manager 208 of FIG. 7, some aspects may employ additional and/or different devices $209_a$-$209_n$, and/or other elements.

Figure 8:
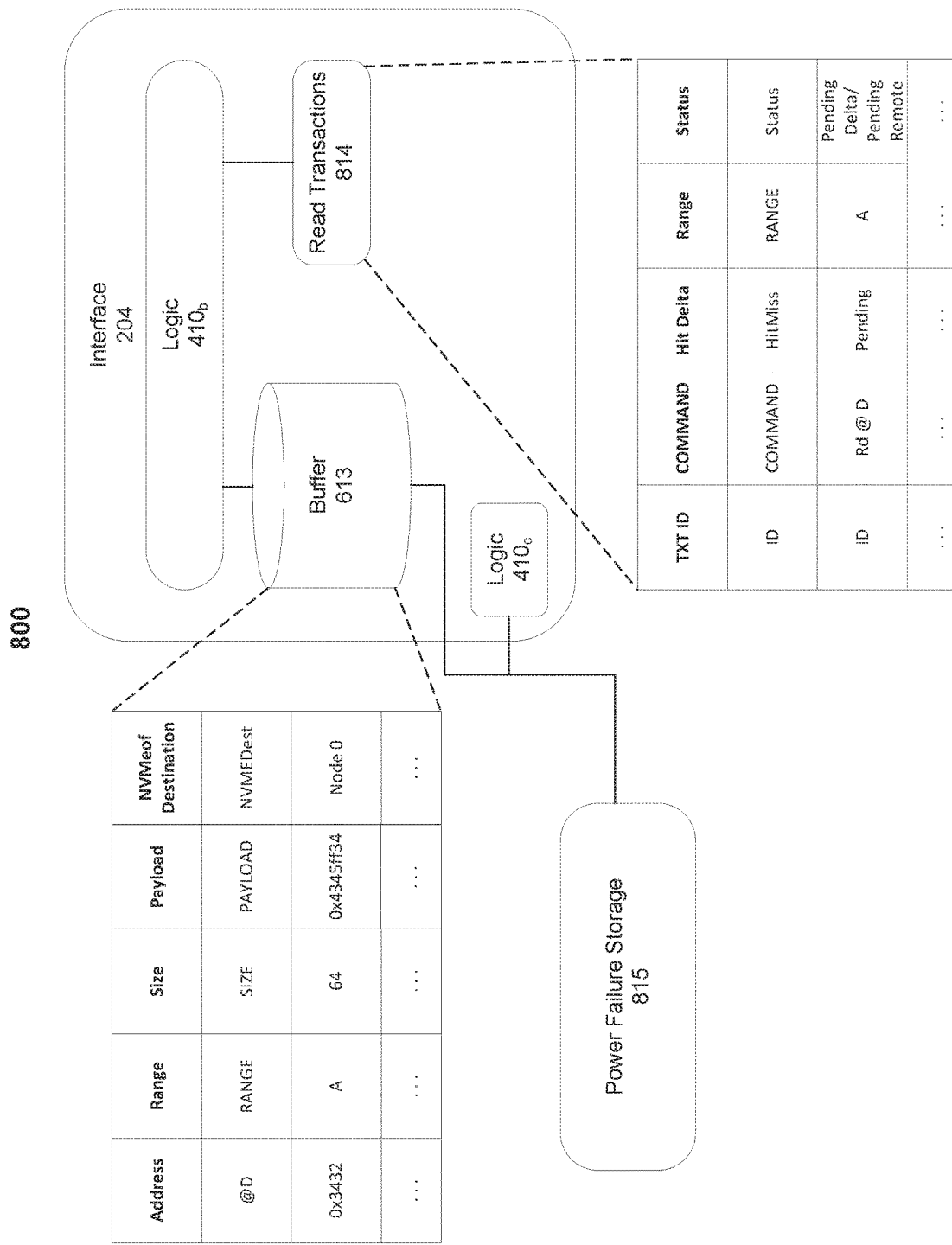
FIG. 8 shows an exemplary interface of the requestor node.

FIG. 8 shows a fifth exemplary networked storage architecture 800 according to some aspects. As shown in FIG. 8, the networked storage architecture 800 may include interface 204 of the requestor node 201 and power failure storage 815. Power failure storage 815 may, in some aspects, be implemented as an NVMe power failure storage. Where previously described, one or more aforementioned aspects of such elements may be incorporated with respect to FIG. 8, either individually, collectively, or any combination thereof. Although interface 204 and power failure storage 815 are illustrated in networked storage architecture 800 of FIG. 8, some aspects may employ additional and/or different interfaces 204, power failure storage 815, and/or other elements.

With continued reference to FIG. 8, interface 204 may include buffer 613, logic $410_b$, logic $410_c$, and read buffer 814. Where previously described, one or more aforementioned aspects of such elements may be incorporated with respect to FIG. 7, either individually, collectively, or any combination thereof. In some aspects, the delta structure implemented by buffer 613 may be a non-volatile structure configured to ensure data will persist in the buffer 613 during and after a power failure. According to at least one aspect, delta structure may be configured to notify (e.g., expose an interface to) interface 204, after a power failure, there is data in the delta structure to be flushed to the target node 206. Delta structure may, in some aspects, be configured to notify (e.g., expose an interface to) interface 204, after a power failure, there is data in the delta structure to be flushed from interface 204.

With continued reference to FIG. 8, logic 410c may include a set of processor executable instructions, which when executed by processor 203 causes processor 203 to perform one or more operations. In some aspects, one or more operations may include notifying (e.g., via a software interrupt) the software stack of the requestor node 201, after booting from a power failure, that data is pending in the delta structure to be sent to the target node 206. According to at least one aspect, the one or more operations may include performing a data backup from buffer 613 and/or read buffer 814 into power failure storage at one or more predetermined intervals. The one or more operations may, in some aspects, include flushing a last level cache (LLC) into a persistent buffer (e.g., read buffer 814) at predetermined intervals (e.g., in the order of milliseconds). In at least one aspect, the one or more operations may include flushing different delta regions to persistent storage (e.g., power failure storage 815)

using asynchronous DRAM refresh (ADR) technologies. Although logic $410_b$, logic $410_c$, buffer 613, and read buffer 814 are illustrated in interface 204 of FIG. 8, some aspects may employ additional and/or different logic, buffers 613, read buffers 814 and/or other elements.

Figure 9:
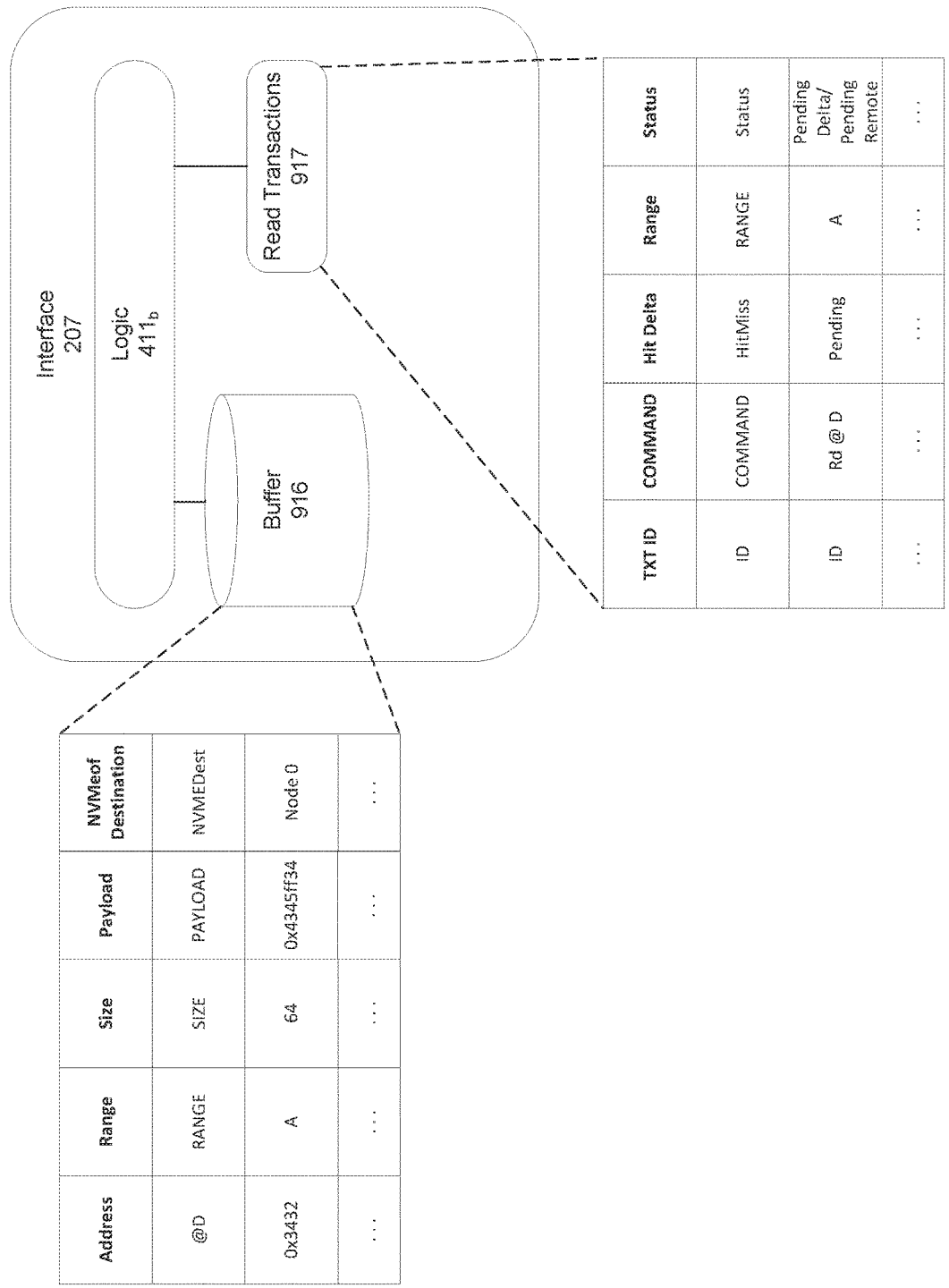
FIG. 9 shows an exemplary interface of the target node.

FIG. 9 shows a sixth exemplary networked storage architecture 900 according to some aspects. As shown in FIG. 9, the networked storage architecture 900 may include interface 207 of the target node 206. Where previously described, one or more aforementioned aspects of this element may be incorporated with respect to FIG. 9, either individually, collectively, or any combination thereof. Although interface 204 is illustrated in networked storage architecture 800 of FIG. 8, some aspects may employ additional and/or different interfaces 207, and/or other elements.

With continued reference to FIG. 9, interface 207 may include buffer 916, read buffer 917 and logic $411_b$. Where previously described, one or more aforementioned aspects of such elements may be incorporated with respect to FIG. 9, either individually, collectively, or any combination thereof.

With continued reference to FIG. 9, interface 207 may, for instance, be configured to receive a variety of transactions from the requestor node 201. In some aspects, interface 207 may be configured to receive and process one or more buffered blocks including one or more incremental write transactions from the buffer 613 of the requestor node 201. According to at least one aspect, interface 207 may be configured to receive and process one or more continuous batches including the plurality of writes transactions from the delta structure of the requestor node 201. Interface 207 may, in some aspects, be configured to receive and process a fabric message comprising a plurality of compressed write transactions targeting a particular device identifier. According to some aspects, interface 207 may be configured to receive and process a delta structure comprising a plurality of compressed write transactions targeting a particular device identifier. In some cases, interface 207 may be configured to receive and process a delta structure comprising a plurality of compressed write transactions targeting a particular device identifier, where the delta structure has appended thereto a write transaction targeting a device identifier other than the particular device identifier.

With continued reference to FIG. 9, buffer 916 may, for instance, be configured to buffer one or more write transactions for the first type of data and/or second type of data. In some aspects, buffer 916 may be implemented as a FIFO. According to at least one aspect, buffer 916 may be implement a delta structure. The delta structure may, in some aspects, be an uncompressed, column-orientated data structure. In at least one aspect, the delta structure may be compressed based on a dictionary compression algorithm. According to some aspects, the delta structure may be a non-volatile structure configured to ensure data will persist in the buffer during a power failure.

With continued reference to FIG. 9, buffer 916 may, for instance, be a content addressable memory (CAM) (e.g., associative memory) configured to facilitate lookup for particular address blocks and target device identification (e.g., NVM_IDS). Upon receipt of input search data (e.g., a tag, word, etc.), the CAM may, in some aspects, be configured to compare the input search data with a table of stored data and return one or more address matching the input search data.

In some aspects, logic $411_b$ may include a set of processor executable instructions, which when executed by a processor of the target node 406 causes the processor 203 of the target node 406 to perform one or more operations described herein. According to at least one aspect, the one or more operations may relate to an NVMeoF operation and/or a delta merge operation. Although buffer 916, read buffer 917 and logic $411_b$ are illustrated in interface 207 of FIG. 9, some aspects may employ additional and/or different logic, buffers 916, read buffers 917 and/or other elements.

FIG. 10 shows a first exemplary method for performing a data transfer over a networked storage architecture according to some aspects. In method 1000 for performing a data transfer over a networked storage architecture, the method includes performing a data transfer of a first type of data from a memory of a computing system to one or more shared storage devices in a first operation mode, the first type of data being associated with a first range of address space of the one or more shared storage devices, the one or more shared storage devices being disaggregate from the computing system 1030, performing a data transfer of a second type of data from the memory to the one or more shared storage devices in a second operation mode, the second type of data being associated with a second range of address space of the one or more shared storage devices different from the first address range 1040, and switching between the first operation mode and the second operation mode based on telemetry data associated with at least one of the computing system or the one or more shared storage devices 1050.

FIG. 11 shows a second exemplary method for performing a data transfer over a networked storage architecture according to some aspects. In method 1100 for performing a data transfer over a networked storage architecture, the method includes selecting a data transfer operation mode from a plurality of data transfer operation modes based on telemetry data, the plurality of data transfer operation modes including a first operation mode in which a first type of data is transferred from a memory of a computing system to one or more shared storage devices, and a second data operation mode in which a second type of data is transferred from the memory to the one or more shared storage devices, the first type of data being associated with a first range of address space of the one or more shared storage devices, the second type of data being associated with a second range of address space of the one or more shared storage devices different from the first range of address space, the one or more shared storage devices being disaggregate from the computing system 1160, and performing a data transfer from the memory to the one or more shared storage devices in the selected data transfer operation mode 1170.

Figure 12:
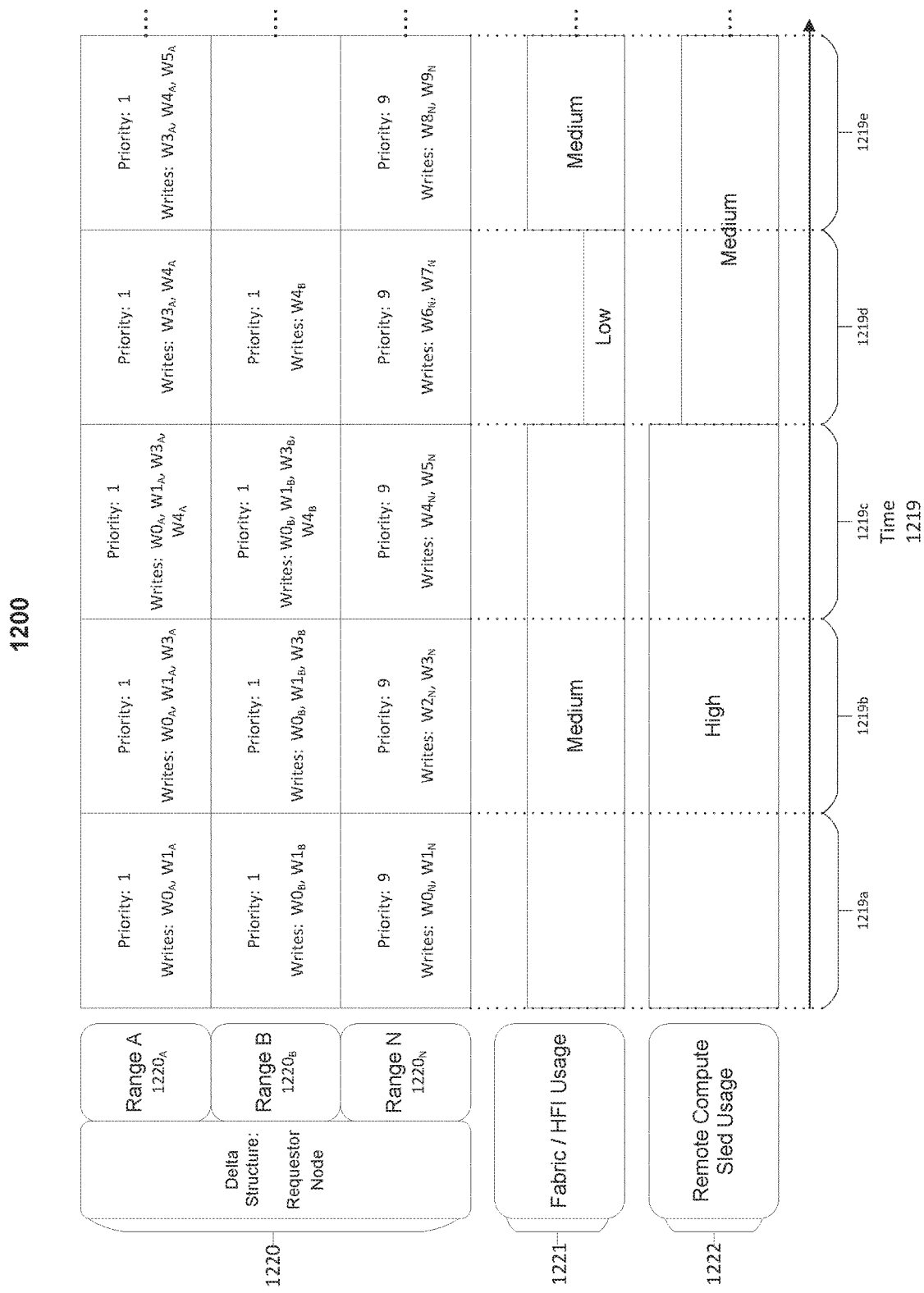
FIG. 12 shows an exemplary comparison between write requests in the delta structure and telemetry data according to some aspects.

FIG. 12 shows an exemplary comparison 1200 between write requests in the delta structure and telemetry data over time. As shown in FIG. 12, comparison 1200 may include three interrelated charts 1220-1222. Chart 1220 depicts an illustrative and logical organization of a plurality of write transactions included in the delta structure in accordance with some aspects. Charts 1221 and 1222 depict two illustrative and different examples of telemetry data.

With continued reference to FIG. 12, each of the three interrelated charts 1220-1222 are depicted as a function of time 1219. As shown in FIG. 12, time 1219 may be divided into a plurality of periods $1219_a$-$1219_e$. Each of the plurality of periods $1219_a$-$1219_e$ have dotted projection lines extending from the time 1219 axis to chart 1220.

With continued reference to FIG. 12, each write transaction of the plurality of write transactions may, for instance, be organized into one of a plurality of ranges $1220_a$-$1220_n$ based on the target address space to which it pertains. In some aspects, each range of the plurality of ranges $1220_a$-$1220_n$ may have one or more priority levels associated therewith. According to at least one aspect, a portion of one range of address space may encompass an entire range of address space of another. For instance, range N $1220_N$ may, in some aspects, be a subset of range B $1220_B$. In at least one aspect, ranges N $1220_N$ and range B $1220_B$ may both be a subset of range A $1220_A$. According to at least one aspect, each write transaction may be grouped with the highest priority level with which it is associated.

With continued reference to FIG. 12, data transfer may, in some aspects, be a function of the range of address space to which each transaction targets, and telemetry data. For instance, one or more operations of logic 410 may, in some aspects, include a data transfer of a second type of data (e.g., $W0_N$-$W9_N$) from one or more storage devices of requestor node 201 to one or more storage devices of target node 206 in the second operation mode. The second type of data may, in some aspects, be associated with a second range of address space (e.g., range N $1120_N$) of the one or more storage devices of the target node 206 that different from the first range of address space (e.g., range A $1220_A$-range N $1220_N$).

With continued reference to FIG. 12, the second operation mode may be performed when the second data transfer criteria is met. In some aspects, the second data transfer criteria may be met when telemetry data indicates a utilization of one or more resources is greater than or equal to the second threshold utilization. According to at least one aspect, the second operation mode may be performed when telemetry data indicates a utilization of one or more resources is greater than or equal to the second threshold utilization (e.g., 50%). By way of illustrative example, the second threshold utilization may be depicted as a "medium" utilization in charts 1221-1222.

As shown in chart 1220, transactions from range N $1220_N$ may, in some aspects, be transferred from the delta structure of requestor node 201 during periods 1219a-1219c when telemetry data indicates the utilization of one or more resources is greater than or equal to a medium utilization. In accordance with some aspects, by transferring higher prioritized data during periods in one or more resources experiences high utilization, a better response time may be achieved for higher prioritized data despite the high utilization. Higher prioritized data may, in some aspects, relate to a latency sensitive application, which can benefit from less resource contention during periods 1219a-1219c in which one or more resources experiences high utilization.

As previously noted, data transfer may, in some aspects, be a function of the range of address space to which each transaction targets, and telemetry data. For instance, one or more operations of logic 410 may, in some aspects, include a data transfer of a first type of data (e.g., $W0_A$-$W5_A$, $W0_B$-$W4_B$ and $W0_N$-$W9_N$) from one or more storage devices of requestor node 201 to one or more storage devices of target node 206 in the first operation mode. The first type of data may, in some aspects, be associated with a first range of address space (e.g., range A $1220_A$-range N $1220_N$) of the one or more storage devices of the target node 206 that different from the second range of address space (e.g., range N $1220_N$).

With continued reference to FIG. 12, the first operation mode may be performed when the first data transfer criteria is met. In some aspects, the first data transfer criteria may be met when telemetry data indicates a utilization of one or more resources is less than or equal to the second threshold utilization. According to at least one aspect, the second operation mode may be performed when telemetry data indicates a utilization of one or more resources is less than or equal to the "medium" utilization in charts 1221-1222.

As shown in chart 1220, transactions from range A $1220_A$-range N $1220_N$ may, in some aspects, be transferred from the delta structure of requestor node 201 during periods 1219d-1219e when telemetry data indicates the utilization of one or more resources is less than or equal to a medium utilization. In accordance with some aspects, by transferring data as a function of both of the range of address space to which each transaction targets, and telemetry data, a better resource utilization may be achieved. As a result, data transfers may, in some aspects, be progressively adapted to changes in resource utilization.

Various layers of optimization may be realized though one or more aspects described herein. In some aspects, a fine grain service level algorithm may be implemented, which treats storage not as a unique address space, but as a heterogeneous address space where priority levels may be delegated and/or modified to one or more disaggregated storage devices. According to at least one aspect, the use of one or more delta-merge schemes in the HFI of an NVMeoF may optimize how the NVMe device is used. For instance, the blending responsibility may, in some aspects, be offloaded from the requestor node 201 to a target node 206 based on the rate at which writes arrive in the requestor node 201. In such as case, the target node 206 may be configured to execute the time-ordered sequence of write requests and merge them into a local device. It should be noted the foregoing is not intended to be an exhaustive list of benefits that may be realized through the implementation of one or more aspects described herein.

Although specific implementations of have been described with the elements of FIGS. 1-12, the present disclosure is not necessarily limited to these aspects. For instance, one or more processors of the requestor node 201 and/or one or more processors of the target node 206, the disclosure are not limited to their respectively described configurations. Additionally or alternatively, at least one or more circuits and/or processors described herein including memory controller 172, I/O Hub 190, or the like may instead realize in any of preceding aspects, implementations and/or following examples.

The following examples pertain to further aspects of this disclosure:

Example 1 is a computing system including one or more processors configured to perform a data transfer of a first type of data from a memory to one or more shared storage devices in a first operation mode of the one or more processors, the first type of data being associated with a first range of address space of the one or more shared storage devices, the one or more shared storage devices being disaggregate from the computing system, perform a data transfer of a second type of data from the memory to the one or more shared storage devices in a second operation mode of the one or more processors, the second type of data being associated with a second range of address space of the one or more shared storage devices different from the first range of address space, and switch between the first operation mode and the second operation mode based on telemetry data associated with at least one of the computing system or the one or more shared storage devices.

Example 2 is a computing system including a memory; and one or more processors configured to perform a data transfer of a first type of data from the memory to one or more shared storage devices in a first operation mode of the one or more processors, the first type of data being associated with a first range of address space of the one or more shared storage devices, the one or more shared storage devices being disaggregate from the computing system, perform a data transfer of a second type of data from the memory to the one or more shared storage devices in a second operation mode of the one or more processors, the second type of data being associated with a second range of address space of the one or more shared storage devices different from the first range of address space, and switch between the first operation mode and the second operation mode based on telemetry data associated with at least one of the computing system or the one or more shared storage devices.

Example 3 is a computing system including one or more processors configured to select a data transfer operation mode from a plurality of data transfer operation modes based on telemetry data, the plurality of data transfer operation modes including a first operation mode in which a first type of data is transferred from a memory to one or more shared storage devices, and a second operation mode in which a second type of data is transferred from the memory to the one or more shared storage devices, the first type of data being associated with a first range of address space of the one or more shared storage devices, the second type of data being associated with a second range of the one or more target storage devices different from the first range of address space, the one or more shared storage devices being disaggregate from the computing system, and perform a data transfer from the memory to the one or more share storage devices in the selected data transfer operation mode.

Example 4 is a computing system including a memory; and one or more processors configured to select a data transfer operation mode from a plurality of data transfer operation modes based on telemetry data, the plurality of data transfer operation modes including a first operation mode in which a first type of data is transferred from the memory to one or more shared storage devices, and a second operation mode in which a second type of data is transferred from the memory to the one or more shared storage devices, the first type of data being associated with a first range of address space of the one or more shared storage devices, the second type of data being associated with a second range of the one or more target storage devices different from the first range of address space, the one or more shared storage devices being disaggregate from the computing system, and perform a data transfer from the memory to the one or more share storage devices in the selected data transfer operation mode.

In Example 5, the subject matter of any one of Examples 1 to 4 can optionally include the memory being implemented as a buffer memory.

In Example 6, the subject matter of any one of Examples 1 to 5 can optionally include the memory being implemented as a first in-first out (FIFO) buffer memory.

In Example 7, the subject matter of any one of Examples 1 to 6 can optionally include the memory including a delta structure.

In Example 8, the subject matter of Example 7 can optionally include the delta structure being implemented as an uncompressed column-oriented data structure.

In Example 9, the subject matter of any one of Examples 7 or 8 can optionally include the delta structure being configured to facilitate a lookup of device identification information of the one or more shared storage devices.

In Example 10, the subject matter of any one of Examples 7 to 9 can optionally include the delta structure being implemented as a non-volatile structure configured to ensure data will persist in the buffer after a power failure.

In Example 11, the subject matter of any one of Examples 1 to 10 can optionally include the first operation mode being implemented as a first write operation mode for the first type of data.

In Example 12, the subject matter of any one of Examples 1 to 11 can optionally include the first operation mode being implemented as a first delta merge operation mode for the first type of data.

In Example 13, the subject matter of any one of Examples 1 to 12 can optionally include the first operation mode being performed when a first data transfer criteria is met.

In Example 14, the subject matter of any one of Example 13 can optionally include the first data transfer criteria being met when the telemetry data associated with at least one of the computing system or the one or more shared storage devices, indicates a utilization greater than or equal to a first threshold utilization.

In Example 15, the subject matter of any one of Examples 13 or 14 can optionally include the first data transfer criteria being met when the telemetry data associated with at least one of the computing system or the one or more shared storage devices indicates a utilization less than or equal to a second threshold utilization.

In Example 16, the subject matter of any one of Examples 1 to 15 can optionally include the first range of address space of the one or more shared storage devices including the second range of address space of the one or more shared storage devices.

In Example 17, the subject matter of any one of Examples 1 to 16, can optionally include the one or more processors being configured to assign a first priority level to the first range of address space of the one or more shared storage devices, and assign a second priority level to the second range of address space of the one or more share storage devices.

In Example 18, the subject matter of Example 17, further including a requestor queue configured to store one or more transactions having the first priority associated therewith, can optionally include the one or more processors configured to modify the first priority level based on at least one of a number of queued transactions having the first priority level associated therewith, a duration in which the queued transactions having the first priority level associated therewith have been pending, a frequency at which data from the first range of address space is accessed, or an aggregate priority level of the requestor queue.

In Example 19, the subject matter of Example 18, can optionally include the requestor queue being configured to store one or more transactions having the second priority associated therewith, and the one or more processors being configured to modify the second priority level based on at least one of a number of queued transactions having the second priority level associated therewith, a duration in which the queued transactions having the second priority level associated therewith have been pending, a frequency at which data from the second range of address space is accessed, or an aggregate priority level of the requestor queue.

In Example 20, the subject matter of any one of Examples 1 to 19 can optionally include the second operation mode being implemented as a second write operation mode for the second type of data.

In Example 21, the subject matter of any one of Examples 1 to 20 can optionally include the second operation mode being implemented as a second delta merge operation mode for the second type of data.

In Example 22, the subject matter of any one of Examples 1 to 21 can optionally include the second operation mode being performed when a second data transfer criteria is met.

In Example 23, the subject matter of Example 22 can optionally include the second data transfer criteria being met when the telemetry data associated with at least one of the computing system or the one or more shared storage devices indicates a utilization greater than or equal to the second threshold utilization.

In Example 24, the subject matter of any one of Examples 22 or 23 can optionally include the first data transfer criteria being met when the telemetry data associated with at least one of the computing system or the one or more shared storage devices indicates a utilization less than or equal to a third threshold utilization.

In Example 25, the subject matter of any one of Examples 1 to 24 can optionally include the telemetry data associated with at least one of the computing system or the one or more shared storage devices includes at least one of bandwidth information, power information, latency information, central processing unit (CPU) utilization information, memory utilization information, or predictive interference information.

In Example 26, the subject matter of any one of Examples 1 to 25 can optionally include the one or more processors being configured to acquire the telemetry data associated with at least one of the computing system or the one or more shared storage devices at a predetermined interval.

In Example 27, the subject matter of Example 26 can optionally include the one or more processors being configured to modify the predetermined interval at which telemetry data associated with at least one of the computing system or the one or more shared storage devices is acquired, based on at least one of a time-averaged telemetry data level or a slope of a telemetry data signal meeting a predetermined interval update criteria.

In Example 28, the subject matter of any one of Examples 7 to 27 can optionally include the one or more processors being configured to determine a capacity level of the delta structure based on at least one of a number of transactions within the delta structure or a cumulative size of the transactions within the delta structure.

In Example 29, the subject matter of Example 28 can optionally include the one or more processors being configured to adapt a rate at which data is transferred in the second mode of operation based on the capacity level of the delta structure.

In Example 30, the subject matter of any one of Examples 7 to 29 can optionally include the one or more processors being configured to perform a read transaction by determining whether the read transaction may be satisfied by the delta structure.

In Example 31, the subject matter of Example 30 can optionally include the one or more processors being configured to return a payload indicated by the read transaction in response to determining the read transaction may be satisfied by the delta structure.

In Example 32, the subject matter of Example 30 can optionally include the one or more processors being configured to store the read transaction in the delta structure in response to determining the read transaction cannot be satisfied by the delta structure.

In Example 33, the subject matter of any one of Examples 30 to 32 can optionally include can optionally include the one or more processors being configured to initialize access with a target node concurrent to determining whether the read transaction may be satisfied by the delta structure, when the read transaction indicates the first data type, and the target node hosts the one or more shared storage devices.

In Example 34, the subject matter of any one of Examples 7 to 30 can optionally include the one or more processors being configured to determine whether a write transaction and another write transaction in the delta structure target a common device identifier of the one or more shared storage devices.

In Example 35, the subject matter of Example 34 can optionally include the one or more processors being configured to merge the write transaction with the other write transaction in response to determining the write transaction and the other write transaction in the delta structure target the common device identifier of the one or more shared storage devices.

In Example 36, the subject matter of any one of Examples 34 or 35 can optionally include the one or more processors being configured to compress the write transaction with the other write transaction into a fabric message in response to determining the write transaction and the other write transaction in the delta structure target the common device identifier of the one or more shared storage devices.

In Example 37, the subject matter of Example 34 can optionally include the one or more processors being configured to append the write transaction to a tail of the delta structure in response to determining the write transaction and the other write transaction in the delta structure target different device identifiers of the one or more shared storage devices.

In Example 38, the subject matter of Example 34 can optionally include the one or more processors being configured to append the write transaction to a tail of the delta structure when the write transaction and the other write transaction in the delta structure target the common device identifier of the one or more shared storage devices and the write transaction specifies non-blending.

Example 39 is a method for performing a data transfer over a networked storage architecture, the method including performing a data transfer of a first type of data from a memory of a computing system to one or more shared storage devices in a first operation mode, the first type of data being associated with a first range of address space of the one or more shared storage devices, the one or more shared storage devices being disaggregate from the computing system; performing a data transfer of a second type of data from the memory to the one or more shared storage devices in a second operation mode, the second type of data being associated with a second range of address space of the one or more shared storage devices different from the first range of address space; and switching between the first operation mode and the second operation mode based on telemetry data associated with at least one of the computing system or the one or more shared storage devices.

Example 40 is a method for performing a data transfer over a networked storage architecture, the method including selecting a data transfer operation mode from a plurality of data transfer operation modes based on telemetry data, the plurality of data transfer operation modes including a first operation mode in which a first type of data is transferred from a memory of a computing system to one or more shared storage devices, and a second operation mode in which a second type of data is transferred from the memory to the one or more shared storage devices, the first type of data being associated with a first range of address space of the one or more shared storage devices, the second type of data being associated with a second range of address space of the one or more shared storage devices different from the first range of address space, the one or more shared storage devices being disaggregate from the computing system, and performing a data transfer from the memory to the one or more shared storage devices in the selected data transfer operation mode.

In Example 41, the subject matter of any one of Examples 39 or 40 can optionally include the memory being implemented as a buffer memory.

In Example 42, the subject matter of any one of Examples 39 to 41 can optionally include the memory being implemented as a first in-first out (FIFO) buffer memory.

In Example 43, the subject matter of any one of Examples 39 to 42 can optionally include the memory including a delta structure.

In Example 44, the subject matter of Example 43 can optionally include the delta structure being implemented as an uncompressed column-oriented data structure.

In Example 45, the subject matter of any one of Examples 43 or 44, further including performing a lookup of device identification information of the one or more shared storage devices in the delta structure.

In Example 46, the subject matter of any one of Examples 43 to 45, further including persistently storing data in the buffer using the delta structure to ensure data remains in the buffer after a power failure.

In Example 47, the subject matter of any one of Examples 39 to 46 can optionally include the first operation mode being implemented as a first write operation mode for the first type of data.

In Example 48, the subject matter of any one of Examples 39 to 47 can optionally include the first operation mode being implemented as a first delta merge operation mode for the first type of data.

In Example 49, the subject matter of any one of Examples 39 to 48 can optionally include the first operation mode being performed when a first data transfer criteria is met.

In Example 50, the subject matter of Example 49 can optionally include the first data transfer criteria being met when the telemetry data associated with at least one of the computing system or the one or more shared storage devices, indicates a utilization greater than or equal to a first threshold utilization.

In Example 51, the subject matter of any one of Examples 49 or 50 can optionally include the first data transfer criteria being met when the telemetry data associated with at least one of the computing system or the one or more shared storage devices, indicates a utilization less than or equal to a second threshold utilization.

In Example 52, the subject matter of any one of Examples 39 to 51 can optionally include the first range of address space of the one or more shared storage devices including the second range of address space of the one or more shared storage devices.

In Example 53, the subject matter of any one of Examples 39 to 52, further including assigning a first priority level to the first range of address space of the one or more shared storage devices; and assigning a second priority level to the second range of address space of the one or more share storage devices.

In Example 54, the subject matter of Example 53, further including storing one or more transactions having the first priority associated therewith in a requestor queue; and modifying the first priority level based on at least one of a number of transactions having the first priority level associated therewith in the requestor queue, a duration in which the queued transactions having the first priority level associated therewith have been pending, a frequency at which data from the first range of address space is accessed, or an aggregate priority level of the requestor queue.

In Example 55, the subject matter of Example 54, further including storing one or more transactions having the second priority associated therewith in the requestor queue; and modifying the second priority level based on at least one of a number transactions having the second priority level associated therewith in the requestor queue, a duration in which the queued transactions having the second priority level associated therewith have been pending, a frequency at which data from the second range of address space is accessed, or an aggregate priority level of the requestor queue.

In Example 56, the subject matter of any one of Examples 39 to 55 can optionally include the second operation mode being implemented as a second write operation mode for the second type of data.

In Example 57, the subject matter of any one of Examples 39 to 56 can optionally include the second operation mode being implemented as a second delta merge operation mode for the second type of data.

In Example 58, the subject matter of any one of Examples 39 to 57 can optionally include the second operation mode being performed when a second data transfer criteria is met.

In Example 59, the subject matter of Example 58 can optionally include the second data transfer criteria being met when the telemetry data associated with at least one of the computing system or the one or more shared storage devices indicates a utilization greater than or equal to the second threshold utilization.

In Example 60, the subject matter of any one of Examples 58 or 59 can optionally include the first data transfer criteria being met when the telemetry data associated with at least one of the computing system or the one or more shared storage devices indicates a utilization less than or equal to a third threshold utilization.

In Example 61, the subject matter of any one of Examples 39 to 60 can optionally include the telemetry data associated with at least one of the computing system or the one or more shared storage devices includes at least one of bandwidth information, power information, latency information, central processing unit (CPU) utilization information, memory utilization information, or predictive interference information.

In Example 62, the subject matter of any one of Examples 39 to 61, further including acquiring the telemetry data associated with at least one of the computing system or the one or more shared storage devices at a predetermined interval.

In Example 63, the subject matter of Example 62, further including modifying the predetermined interval at which telemetry data associated with at least one of the computing system or the one or more shared storage devices is acquired, based on at least one of a time-averaged telemetry data level or a slope of a telemetry data signal meeting a predetermined interval update criteria.

In Example 64, the subject matter of any one of Examples 43 to 63, further including determining a capacity level of the delta structure based on at least one of a number of transactions within the delta structure or a cumulative size of the transactions within the delta structure.

In Example 65, the subject matter of Example 64, further including adapting a rate at which data is transferred in the second mode of operation based on the capacity level of the delta structure.

In Example 66, the subject matter of any one of Examples 43 to 65, further including performing a read transaction by determining whether the read transaction may be satisfied by the delta structure.

In Example 67, the subject matter of Example 66, further including returning a payload indicated by the read transaction in response to determining the read transaction may be satisfied by the delta structure.

In Example 68, the subject matter of Example 66, further including storing the read transaction in the delta structure in response to determining the read transaction cannot be satisfied by the delta structure.

In Example 69, the subject matter of any one of Examples 66 to 68, further including initializing access with a target node concurrent to determining whether the read transaction may be satisfied by the delta structure, when the read transaction indicates the first data type, can optionally include the target node hosts the one or more shared storage devices.

In Example 70, the subject matter of any one of Examples 43 to 69, further including determining whether a write transaction and another write transaction in the delta structure target a common device identifier of the one or more shared storage devices.

In Example 71, the subject matter of Example 70, further including merging the write transaction with the other write transaction in response to determining the write transaction and the other write transaction in the delta structure target the common device identifier of the one or more shared storage devices.

In Example 72, the subject matter of any one of Examples 70 or 71, further including compressing the write transaction with the other write transaction into a fabric message in response to determining the write transaction and the other write transaction in the delta structure target the common device identifier of the one or more shared storage devices.

In Example 73, the subject matter of Example 70, further including appending the write transaction to a tail of the delta structure in response to determining the write transaction and the other write transaction in the delta structure target different device identifiers of the one or more shared storage devices.

In Example 74, the subject matter of Example 70, further including appending the write transaction to a tail of the delta structure when the write transaction and the other write transaction in the delta structure target the common device identifier of the one or more shared storage devices and the write transaction specifies non-blending.

Example 75 is a computing device comprising one or more processors configured to perform the method of any one of Examples 39 to 74.

Example 76 is a processing circuit configured to perform the method of any one of Examples 39 to 74.

Example 77 is a non-transitory computer readable medium storing instructions that when executed by a processor cause the processor to perform the method of any one of Examples 39 to 74.

Example 78 is a non-transitory computer readable medium storing instructions that when executed by processing circuitry of a computing device cause the computing device to perform the method of any one of Examples 39 to 74.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The terminology used herein is for the purpose of describing particular example aspects only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example aspects.

While the disclosure has been particularly shown and described with reference to specific aspects, it should be understood by those skilled in the art that various changes in form and detail may be made therein without departing from the spirit and scope of the disclosure as defined by the appended claims. The various aspects of this disclosure are not necessarily mutually exclusive, as some aspects of this disclosure can be combined with one or more some aspects of this disclosure to form new aspects. The scope of the disclosure is thus indicated by the appended claims and all changes which come within the meaning and range of equivalency of the claims are therefore intended to be embraced.

What is claimed is:

1. A computing system, comprising:
one or more processors configured to
perform a data transfer of a first type of data from a memory to one or more shared storage devices in a first operation mode of the one or more processors, the first type of data being associated with a first range of address space of the one or more shared storage devices, the one or more shared storage devices being disaggregate from the computing system,
perform a data transfer of a second type of data from the memory to the one or more shared storage devices in a second operation mode of the one or more processors, the second type of data being associated with a second range of address space of the one or more shared storage devices different from the first range of address space, and
switch between the first operation mode and the second operation mode based on telemetry data associated with at least one of the computing system or the one or more shared storage devices; and
wherein the first operation mode is performed when a first data transfer criteria is met, and
the first data transfer criteria is met when the telemetry data associated with at least one of the computing system or the one or more shared storage devices, indicates a utilization less than or equal to a first threshold utilization.

2. The computing system of claim 1,
wherein the memory comprises a delta structure configured to facilitate a lookup of device identification information of the one or more shared storage devices.

3. The computing system of claim 1,
wherein the one or more processors are configured to assign a first priority level to the first range of address space of the one or more shared storage devices, and
assign a second priority level to the second range of address space of the one or more share storage devices.

4. The computing system of claim 2, wherein the one or more processors are configured to determine a capacity level of the delta structure based on at least one of a number of transactions within the delta structure or a cumulative size of the transactions within the delta structure.

5. The computing system of claim 4, wherein the one or more processors are configured to adapt a rate at which data is transferred in the second mode of operation based on the capacity level of the delta structure.

6. The computing system of claim 2, wherein the one or more processors are configured to determine whether a write transaction and another write transaction in the delta structure target a common device identifier of the one or more shared storage devices.

7. The computing system of claim 6, wherein the one or more processors are configured to merge the write transaction with the other write transaction in response to determining the write transaction and the other write transaction in the delta structure target the common device identifier of the one or more shared storage devices.

8. The computing system of claim 6, wherein the one or more processors are configured to append the write transaction to a tail of the delta structure when the write transaction and the other write transaction in the delta structure target the common device identifier of the one or more shared storage devices and the write transaction specifies non-blending.

9. A method for performing a data transfer over a networked storage architecture, the method comprising:
performing a data transfer of a first type of data from a memory of a computing system to one or more shared storage devices in a first operation mode, the first type of data being associated with a first range of address space of the one or more shared storage devices, the one or more shared storage devices being disaggregate from the computing system;
performing a data transfer of a second type of data from the memory to the one or more shared storage devices in a second operation mode, the second type of data being associated with a second range of address space of the one or more shared storage devices different from the first range of address space; and
switching between the first operation mode and the second operation mode based on telemetry data associated with at least one of the computing system or the one or more shared storage devices;
wherein the first operation mode is performed when a first data transfer criteria is met, and the first data transfer criteria is met when the telemetry data associated with at least one of the computing system or the one or more shared storage devices, indicates a utilization less than or equal to a first threshold utilization.

10. The method of claim 9, wherein the memory is a first in-first out (FIFO) buffer memory comprising a delta structure.

11. The method of claim 9,
wherein the first operation mode is a first delta merge operation mode for the first type of data, and
the second operation mode is a second delta merge operation mode for the second type of data.

12. The method of claim 9, wherein the first range of address space of the one or more shared storage devices comprises the second range of address space of the one or more shared storage devices.

13. The method of claim 9,
wherein the second operation mode is performed when a second data transfer criteria is met, and
the second data transfer criteria is met when the telemetry data associated with at least one of the computing system or the one or more shared storage devices indicates a utilization greater than or equal to the second threshold utilization.

14. The method of claim 9, further comprising:
acquiring the telemetry data associated with at least one of the computing system or the one or more shared storage devices at a predetermined interval; and
modifying the predetermined interval at which telemetry data associated with at least one of the computing system or the one or more shared storage devices is acquired, based on at least one of a time-averaged telemetry data level or a slope of a telemetry data signal meeting a predetermined interval update criteria.

15. The method of claim 10, further comprising:
determining whether a write transaction and another write transaction in the delta structure target a common device identifier of the one or more shared storage devices.

16. The method of claim 15, further comprising:
appending the write transaction to a tail of the delta structure in response to determining the write transaction and the other write transaction in the delta structure target different device identifiers of the one or more shared storage devices.

17. A method for performing a data transfer over a networked storage architecture, the method comprising:
selecting a data transfer operation mode from a plurality of data transfer operation modes based on telemetry data, the plurality of data transfer operation modes including a first operation mode in which a first type of data is transferred from a memory of a computing system to one or more shared storage devices, and a second operation mode in which a second type of data is transferred from the memory to the one or more shared storage devices, the first type of data being associated with a first range of address space of the one or more shared storage devices, the second type of data being associated with a second range of address space of the one or more shared storage devices different from the first range of address space, the one or more shared storage devices being disaggregate from the computing system, and
performing a data transfer from the memory to the one or more shared storage devices in the selected data transfer operation mode.

18. The method of claim 17, wherein the memory is a first in-first out (FIFO) buffer memory comprising a delta structure.

19. The method of claim 18, further comprising:
determining a capacity level of the delta structure based on at least one of a number of transactions within the delta structure or a cumulative size of the transactions within the delta structure; and
adapting a rate at which data is transferred in the second operation mode based on the capacity level of the delta structure.

* * * * *